United States Patent [19]

Wertz et al.

[11] Patent Number: 5,345,309

[45] Date of Patent: Sep. 6, 1994

[54] PRECISION THREE DIMENSIONAL PROFILING AND MEASUREMENT SYSTEM FOR CYLINDRICAL CONTAINERS

[75] Inventors: Ronald D. Wertz, Boulder; H. Kent Minet, Littleton; Stephen M. Horacek, Louisville; Brett A. Nickerson, Northglenn, all of Colo.

[73] Assignee: Ball Corporation, Muncie, Ind.

[21] Appl. No.: 774,199

[22] Filed: Oct. 10, 1991

[51] Int. Cl.$^5$ .................................. G01N 21/90
[52] U.S. Cl. ................................ 356/372; 356/376; 356/381; 356/428; 33/522; 33/807; 33/546; 33/553; 348/127; 348/135
[58] Field of Search ............... 356/237, 240, 372, 376, 356/381, 382, 384, 426–428, 72, 73; 250/560, 223 B; 33/783, 784, 797, 798, 800, 807, 833, 834, 522, 546, 547, 551, 553, 554, 808, 558, 558.01–558.1, 548, 549, 552, 555, 556, 557, 560

[56] References Cited

U.S. PATENT DOCUMENTS

| | | | |
|---|---|---|---|
| 1,557,341 | 10/1925 | Sealbom | 33/797 |
| 1,697,058 | 1/1929 | Eggers | 33/800 |
| 1,990,138 | 2/1935 | Schuster | 33/800 |
| 2,616,068 | 10/1952 | McDonald | 33/558 |
| 3,666,885 | 5/1972 | Hemsley et al. | 178/6.8 |
| 3,769,713 | 11/1973 | Norman | 33/548 |
| 4,162,126 | 7/1979 | Nakagawa et al. | 356/237 |
| 4,226,539 | 10/1980 | Nakagawa et al. | 356/445 |
| 4,298,285 | 11/1981 | Ito | 356/376 |
| 4,326,808 | 4/1982 | Pryor et al. | 356/445 |
| 4,410,278 | 10/1983 | Makihira et al. | 356/445 |
| 4,464,840 | 8/1984 | Newland | 33/783 |
| 4,465,937 | 8/1984 | Forbes | 250/560 |
| 4,473,951 | 10/1984 | Golinelli et al. | 33/783 |
| 4,476,533 | 10/1984 | Daudt et al. | 364/473 |
| 4,576,482 | 3/1986 | Pryor | 356/376 |
| 4,629,319 | 12/1986 | Clarke et al. | 356/237 |
| 4,675,730 | 6/1987 | Adomoiitis et al. | 358/106 |
| 4,798,002 | 1/1989 | Salzer et al. | 356/381 |
| 4,862,596 | 9/1989 | Iino et al. | 33/522 |
| 4,863,275 | 9/1989 | Cormack et al. | 356/376 |
| 4,872,757 | 10/1989 | Cormack et al. | 356/376 |
| 4,906,098 | 3/1990 | Thomas et al. | 356/240 |
| 4,941,269 | 7/1990 | Mori et al. | 33/783 |
| 5,048,341 | 9/1991 | Lundell et al. | 33/610 |
| 5,154,003 | 10/1992 | Moore | 33/798 |

FOREIGN PATENT DOCUMENTS

| | | |
|---|---|---|
| 62-0156643 | 6/1987 | Japan . |
| 62-0234980 | 9/1987 | Japan . |
| 64-2744 | 1/1989 | Japan . |
| 64-78102 | 3/1989 | Japan . |
| 0223555 | 5/1987 | United Kingdom . |

OTHER PUBLICATIONS

PLM Metop—A Quality Concept in Can Quality Control.
Gage Heads—AC-Operated LVDT Type—Technical Bulletin 1506B—Schaevitz.
IBM PC/XT/AT Compatible Multifunction Analog * Digital I/O Boards—2-24 to 2-27.
Next Generation OP-07 (Ultra-Low Offset Voltage Operational Amplifier)-OP-77.
Preliminary Specifications—Digital Outut CCD Camera—COHU Electr. Div.
VFG Hardware Reference Manual—47-H30005-0-0—Imaging Technology Inc.
LVDT Signal Conditioner—Analog Devices—Piper Sales Company.

Primary Examiner—Richard A. Rosenberger
Assistant Examiner—Hoa Q. Pham
Attorney, Agent, or Firm—Gilbert E. Alberding

[57] ABSTRACT

A system for generating a solid model of the sidewall of the container. A mandrel selectively holds the container in first and second locations. In the first location, a non-contact measurement apparatus utilizing a digital camera produces digital information for generating a three dimensional sidewall surface profile of the container based upon shadow edge detection. In the second position, a contact measurement apparatus produces information for generating a three dimensional sidewall thickness map of the container. A computer collects the information from the contact and non-contact measurement apparatuses and produces an overall solid model of the sidewall of the container based upon sidewall surface profile and sidewall thickness. The computer generates can tilt, diameter, can ovality, and can squarity information.

43 Claims, 18 Drawing Sheets

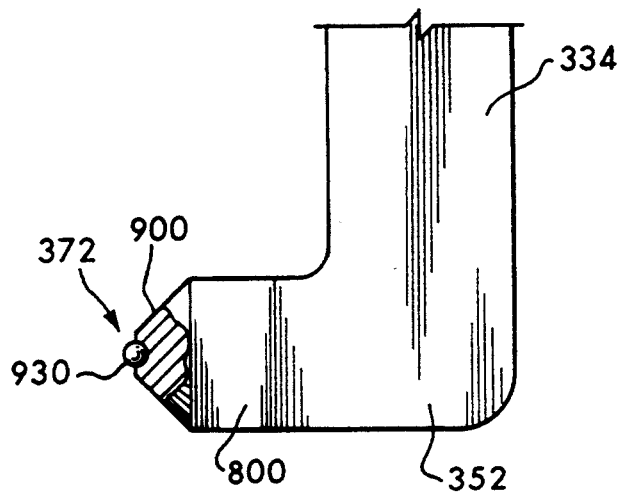
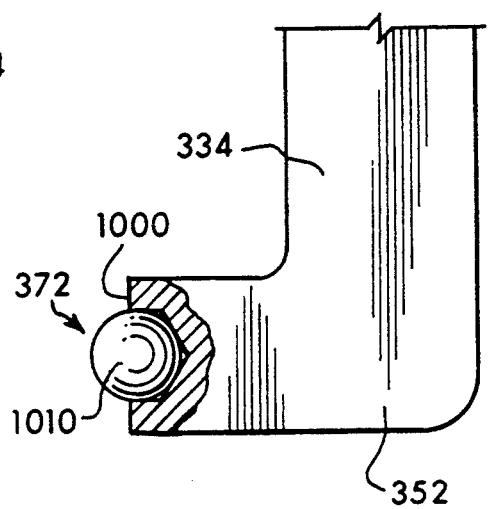
Fig. 9
Fig. 10
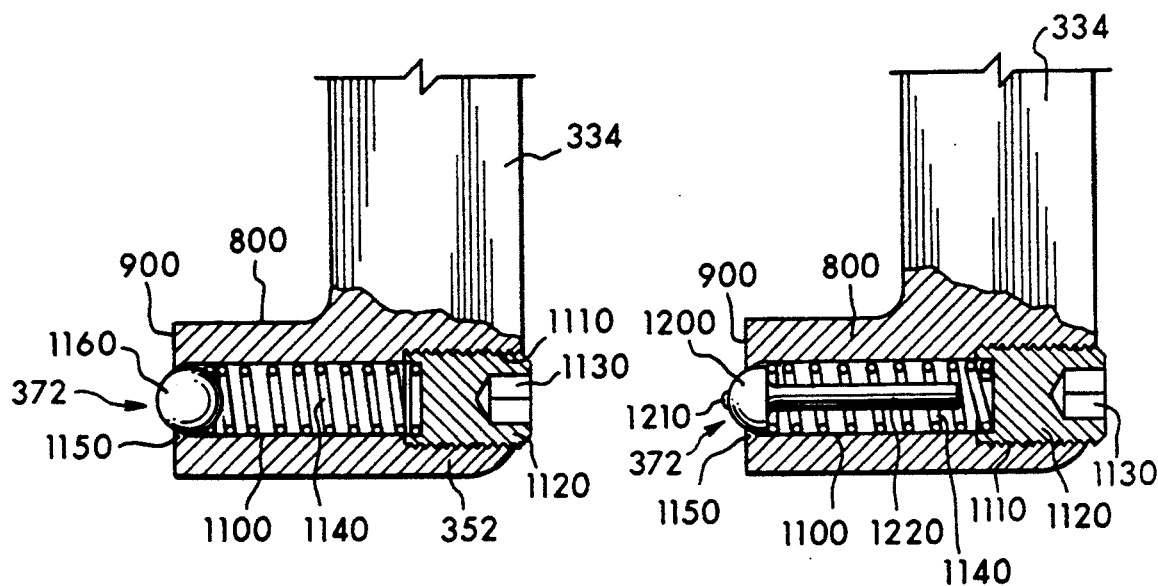
Fig. 11
Fig. 12

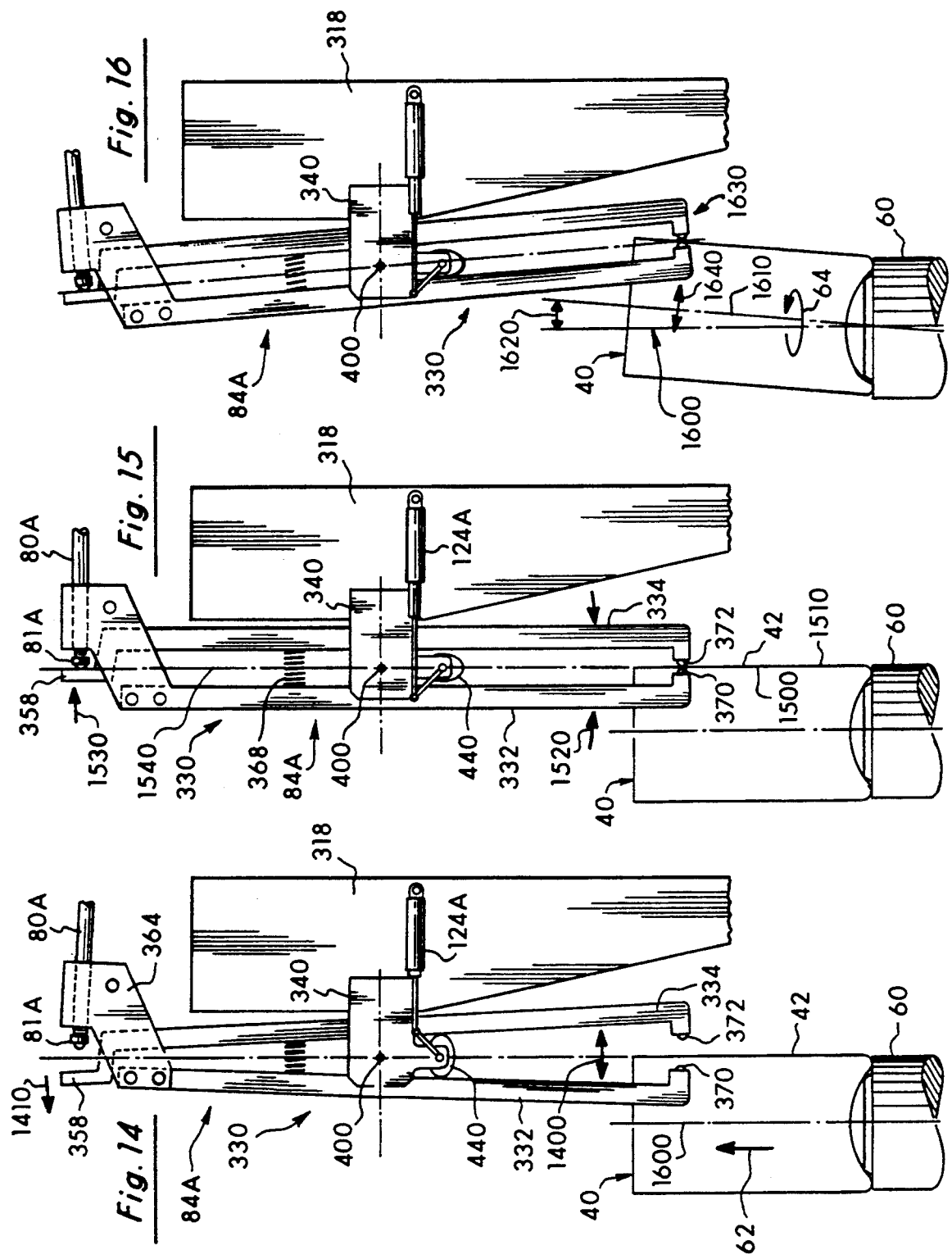

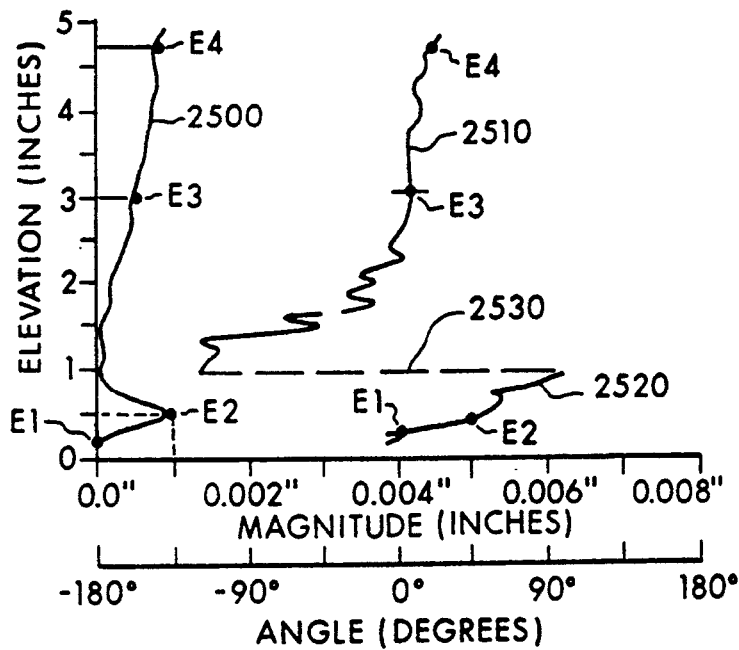
Fig. 25
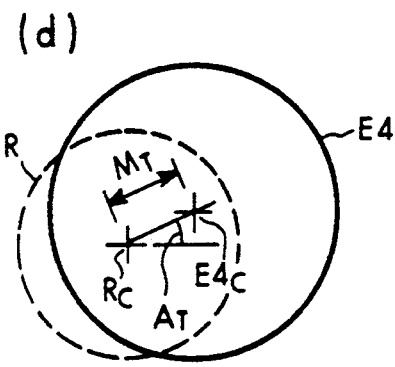
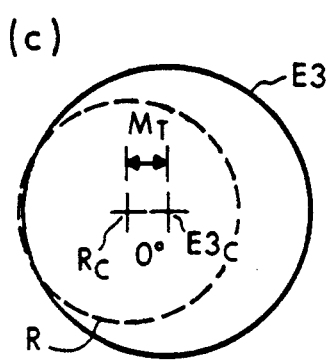
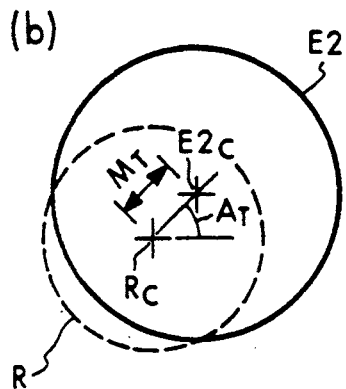
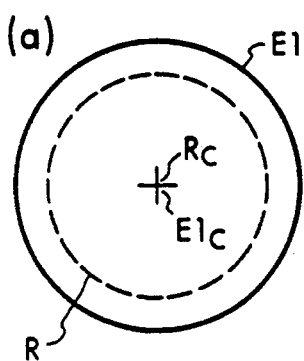
Fig. 26

QUALITY

SQUARITY

PRECISION THREE DIMENSIONAL PROFILING AND MEASUREMENT SYSTEM FOR CYLINDRICAL CONTAINERS

BACKGROUND OF THE INVENTION

1. Field of the Invention

The present invention relates to systems and methods for profiling surfaces of an object such as found in a cylindrical container and, in particular, the present invention relates to a profiling measurement system for beverage cans that utilizes both non-contact optical profiling and contact mechanical gauging to provide overall sidewall surface and thickness information for the beverage can as well as diameter, tilt, ovality and squarity.

2. Statement of the Problem

There are needs in industry to provide a three dimensional profile of the surfaces of cylindrical containers to ascertain the conformance of cans to design specifications, to aid in the understanding of the various manufacturing or shipping processes on the container, to analyze the material properties of the container, and/or to track the variations in can configuration caused by the manufacturing processes involved.

For example, aluminum beverage cans are containers having a convex surface around their entire outer cylindrical sidewall which may be as thin as 0.003 inches. Conventional surface evaluation techniques can provide precise measurements of unfilled beverage cans utilizing contact techniques, but such techniques are principally limited to discrete measurements. Furthermore, it is difficult to repeat measurements. Hence, a need also exists to evaluate the sidewalls of aluminum beverage cans and to provide repeatable metrology of the entire can sidewalls so that information concerning the process can be obtained. Such information provides valuable feedback in understanding, evaluating, and adjusting the manufacturing processes to form the can.

While the present invention is generally directed towards the surface profiling and thickness measuring of aluminum beverage cans, it is to be expressly understood that any convex surface or portion thereof of a container, work piece, or object could be likewise evaluated under the teachings of the present invention. In U.S. Pat. Nos. 4,872,757 and 4,863,275 commonly assigned to the assignee of the present invention, an optical convex surface profiling engaging apparatus and method is set forth. The present invention utilizes and improves upon the teachings of the optical profiling instrumentation of U.S. Pat. No. 4,863,275 to provide optically generated data of the present invention.

The teachings of the '275 and '757 patents are improved upon by reducing noise and providing higher resolution in the optical path and by adding a separate mechanical contact measurement system which contacts the inside and outside surfaces of the container to provide a thickness profile circumferentially around the container. The contact gauging approach is designed so as to perform its gauging without deflection or deformation of the container sidewalls. A need exists, therefore, to improve upon the resolution and to lower the noise of the '275 and '757 approaches. A need further exists to provide a separate sidewall thickness data input from a mechanical gauging system so as to generate a combined thickness dimension to the overall surface profiling of the container so that an overall topological profile of the container can be generated.

A need also exists to automatically obtain a plurality of precision measurements of circumferential sidewall thicknesses at a number of elevations, the dome height, overall height, tilt, ovality, squarity, and the surface profile of a container. In addition, a need further exists to make the combined optical and contact profiling approaches easy to calibrate and to autozero the system for each new container being profiled.

A further need exists to make the overall combined profiling system based upon the use of a simple computer such as a personal computer which can correlate the two independent sources of contact and non-contact data together so as to provide a correlated output containing the measured physical characteristics of the profiled container.

A need exists to provide the mechanical gauging of the thickness with a transducer that performs the actual thickness measurements without deforming the surface of the sidewalls of the container.

Finally, a need exists to provide a system rugged and reliable enough to provide precision container measurements on the factory floor as well as one precise enough for critical measurements in the laboratory.

3. Prior Art Patented Approaches

A number of needs therefore exist for a profiling measurement system that can be used in the manufacturing environment for surface and thickness profiling of containers such as aluminum beverage cans and for the detection of defects therein.

U.S. Pat. No. 4,629,319 by Clarke et al. sets forth an invention for the electro-optical sensing of defects such as dents, creases, low spots and flat spots on the surface of sheet metal or plastic panels such as those used on the hoods and fenders of cars, refrigerators and furniture. Clarke directs light onto the surface. The light reflected from the surface impinges upon a retro-reflective member to return the reflected light to the surface area to be re-reflected. The re-reflected light is then imaged and carries information as to the nature of the defect.

U.S. Pat. No. 4,326,808 issued to Pryor et al. sets forth an apparatus for determining defects in the outer surface of an elongated object wherein the object to be inspected passes through an aperture of a conical mirror surface. The light is directed onto the mirror surface, reflected by the object, imaged and then analyzed to determine the nature of the defect.

U.S. Pat. No. 4,675,730 issued to Adomaitis sets forth an apparatus for continuously inspecting the surface of a moving object for defects. The surface of the object is illuminated with both specular and/or diffused light of selected wavelengths. The moving surface is rendered momentarily motionless and a plurality of sensors located to view the width of the object detects the presence of the defects. An electronic image of the defect contains gray scale levels that represent varying intensities of the light reflected by the defect. A comparison is then made with a defect free image and, if different, then a freeze frame analysis of the object is made.

U.S. Pat. No. 4,410,278 issued to Makihira et al. sets forth an apparatus for inspecting the outer peripheral surface of a cylindrical object. The light, in slit form, is projected on the surface of the cylindrical object. The reflected light is detected by a photo detector and is quantitized at threshold values higher or lower than an average level. The three types of surface defects of a chip, a crack, and a pit are separately detected and identified.

U.S. Pat. No. 4,226,539 issued to Nakagawa et al. also sets forth a system for cylindrical body surface inspection. The cylindrical body is rotated around its axis at a constant speed. Light is directed onto the surface of the body and an optical detector detects the reflected light indicative of a surface condition of a small width baseline which is parallel to the axis of the cylindrical body. A sampling detection repeats as the body rotates to scan the entire surface of the cylinder.

U.S. Pat. No. 4,162,126 issued to Nakagawa et al. sets forth a camera system which senses diffused reflected light from the surface of an object in order to analyze the reflected light wherein a threshold level is used so that surface defect patterns such as a broken cavity, a pit, or a crack pattern can be selectively discriminated.

All of the above represent prior approaches for surface profiling and gauging involve a non-contacting system like the present invention. However, each of these approaches analyzes light which is reflected from the surface and they are suitable for evaluating convex surfaces. The present invention does not analyze reflected light; rather, it evaluates a shadow edge from the container as it is being rotated.

The following prior art approaches set forth inspection techniques which analyze the shadow of the object being inspected.

U.S. Pat. No. 4,576,482 issued to Pryor sets forth an apparatus for determining accurate dimensions of individual work pieces. The apparatus is a non-contacting system wherein a collimated or semi-collimated light source illuminates at least one edge of the work piece with parallel light rays so that a lens can form an image of the illuminated edge. This image provides an average shadow over an area of the edge. An array of photosensitive elements such as photodiodes produce an electrical signal in response to the light impacting thereon. The edge image as sensed by the photodiode array can then be analyzed to provide a determination of a dimension such as length, squareness, curvature and the like.

The 1972 patent to Hemsley (U.S. Pat. No. 3,666,885) utilizes a strobe for directing a short duration light pulse onto the object to form a shadow image of the object in a camera. The camera is modified for single line scanning and produces a line waveform of the shadow image. The Hemsley approach is adaptable for either hot or cold objects being scanned. Hemsley utilizes a referenced object to determine the initial measurement and then compares the object being inspected to the measured value and records any differences in the line waveforms.

The 1984 patent to Forbes (U.S. Pat. No. 4,465,937) utilizes a light source mounted in a scanning head that is rotated about the object and which can be advanced along the length of the object to provide data pertaining to the entire peripheral surface of the object. Forbes utilizes a light source that provides a beam of light having a width greater than the width of the object being scanned so that as the light source is rotated around the object, deviations in the shadow's edge can be sensed by photo sensors and determined.

The 1984 patent to Daudt (U.S. Pat. No. 4,476,533) pertains to a non-contact optical gauger for measuring hot glassware articles while they are being manufactured. The system makes specific measurements of height, perpendicular, neck diameter, and height variation of the glassware article. Articles falling outside predetermined measurements are rejected.

The METOP® computerized front end and back end stations are available for measuring sidewall thicknesses of two piece cans. The METOP® system is manufactured by Metop, Box 836, S-20180 Malmo Sweden. The METOP® system is not suitable for automatic measurement since it requires hand loading of the cans. Because of the hand loading, the operator in handling the can may deform the can or portions thereof. In addition, once a measurement is made and the can removed, a repeat measurement at the same location is extremely difficult to obtain.

4. Solution to the Problem

The above prior art approaches do not set forth a combined profiling system designed for factory operation which utilizes data generated from a non-contact system and data from a contact system for providing overall sidewall information correlating the two independently generated sets of data together. The outputted sidewall information of the present invention includes a solid model of the container sidewall and container diameter, tilt, ovality, squarity and/or height. In the case of a beverage can, the dome height is also provided. The present invention, therefore, substantially improves upon the above prior art approaches.

The present invention performs both contact and non-contact measurements on containers that are placed on a rotating mandrel that can be selectively raised and lowered. In the lower position, the container is positioned within the optical train of the non-contact measurement apparatus wherein a plurality of measurements of the container's edge are made during a first time interval so as to construct a surface profile of the sidewall of the container. The present invention improves upon the surface profile information by using a digital camera that digitizes directly to the signals from each pixel based upon a shadow edge. The present invention significantly improves upon the precision of the sub-pixel interpolation algorithm used to find the shadow edge of a container image.

The mandrel is then raised to the second contact measurement position during a second time interval. A plurality of sensor mechanisms selectively engage the sidewalls of the container through pneumatic actuation. The container is then rotated and each sensor is sampled a predetermined number of times to obtain a plurality of sidewall thicknesses at different elevations. A unique balanced double-pivot scissors arrangement is used in each sensor mechanism to make the sidewall thickness measurement. The balanced double-pivot scissors mechanism is pivotally mounted to permit free rotation so as to accommodate varying radial diameters of the container. A second pivot concentric to the first pivot permits the arms of the scissors to open and close about the sidewall of the container. The balanced double-pivot scissors mechanism is designed to minimize errors caused by environmental temperature changes.

The present invention utilizes a unique autocalibration technique before the sidewall measurements of each container are made.

SUMMARY OF THE INVENTION

A factory based system for generating a solid model of the sidewall of the container. A mandrel selectively holds the container in first and second locations. In the first location during a first time interval, a non-contact measurement apparatus utilizing a digital camera produces digital information for generating a three dimensional sidewall surface profile of the container based upon shadow edge detection. In the second position during a second time interval, a contact measurement apparatus produces information for generating a three dimensional sidewall thickness map of the container. A computer collects the information from the contact and non-contact measurement apparatuses and produces an overall solid model of the sidewall of the container based upon sidewall surface profile and sidewall thickness. The computer also generates container tilt, container ovality, and container squarity information.

A unique balanced double-pivot scissors mechanism for measuring sidewall thickness of the container utilizes a pair of scissors having an inner arm and an outer arm. Contacts located near the bottom end of each of the inner and outer arms are directed perpendicularly towards opposing sides of the container sidewall. A transducer is located near the top end of the inner and outer arms and senses the distance between the contacts which is proportional to the thickness of the sidewall of the container. A double-pivot mechanism permits two types of pivoting. The first pivoting enables the first and second arms to move with respect to each other about a central pivot so as to selectively open and close the contacts to and from the sidewall. The second pivoting action permits the first and second arm to move together about the central pivot in order to track the position of the sidewall as the position of the sidewall varies due to varying radius of the container.

DESCRIPTION OF THE DRAWING

FIG. 9 is a first indexing embodiment showing a partial cross-section the contacts of the present invention;

FIG. 10 is a second indexing embodiment of the contacts shown in partial cross-section of the present invention;

FIG. 11 is a first sliding embodiment of the contacts of the present invention shown in partial cross-section;

FIG. 12 is a second sliding embodiment of the contacts of the present invention shown in partial cross-section;

FIG. 14 illustrates the opening of the scissors of the present invention;

FIG. 15 illustrates the closed scissors of the present invention during measurement of sidewall thickness;

FIG. 16 illustrates the movement of the scissors of the present invention and responds to can eccentricity;

FIG. 25 sets forth information obtained from the non-contact measurement apparatus 30 for the "tilt" of a container;

FIGS. 26(A), 26(B), 26(C), and 26(D) illustrates the tilt of a container;

SPECIFICATION

1. General Discussion

Figure 1:
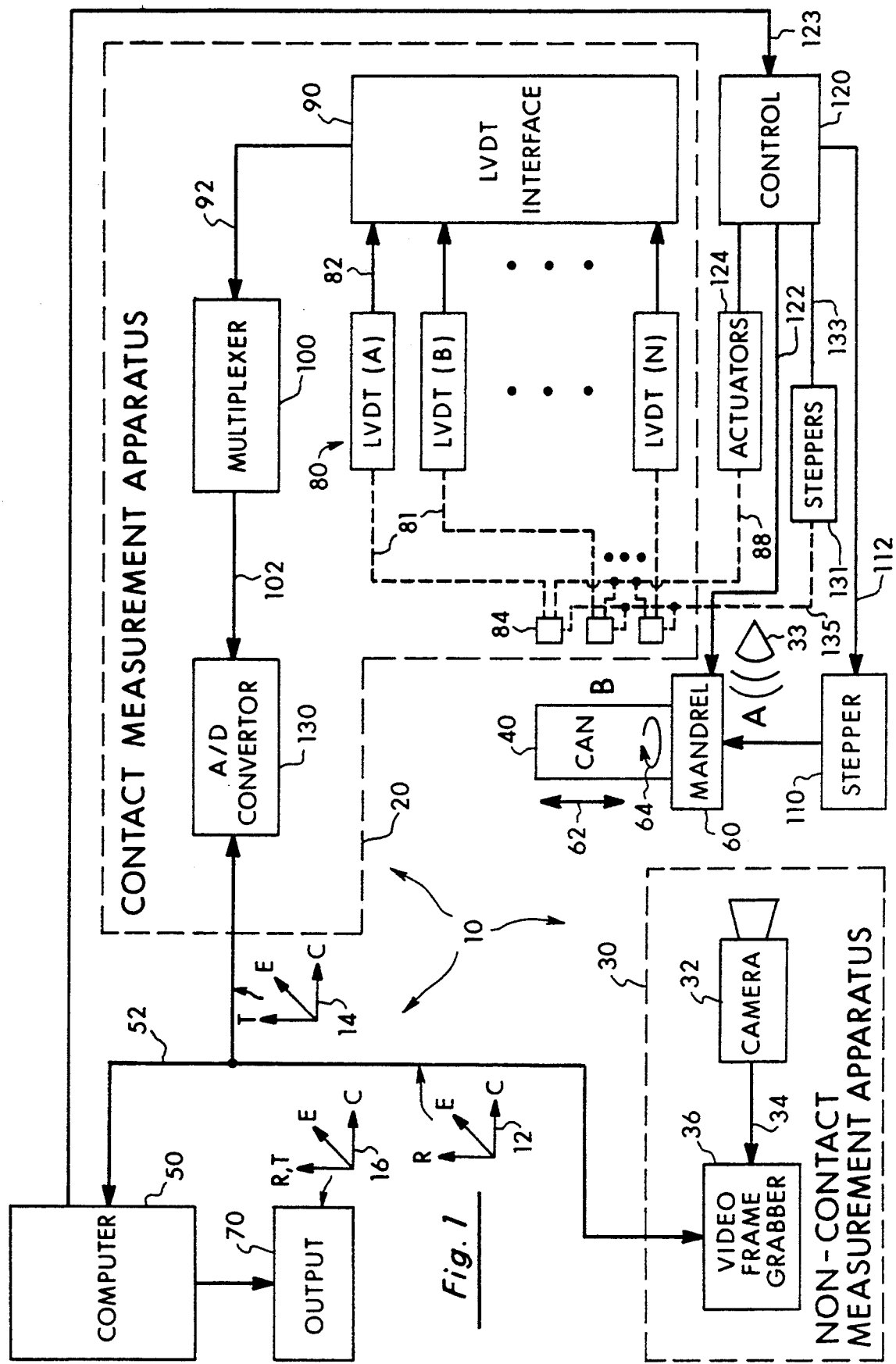
FIG. 1 is a block diagram of the overall components of the present invention.

In FIG. 1, the general configuration of the profiling system 10 of the present invention is set forth. The present invention 10 provides a contact measurement apparatus 20 for measuring sidewall thickness of a container 40 such as a beverage can and a non-contact measurement apparatus 30 for profiling the sidewall exterior surface of the container 40. The measurements of the contact apparatus 20 and the non-contact apparatus 30 in the form of digital signals are delivered over bus 52 into computer 50 where the measurements are correlated to generate a solid model of the sidewall of container 40. During the remaining specification, the term "can" will be utilized and shall include not only a beverage can but any suitable cylindrical container or object.

The can 40 is placed on a conventional mandrel 60. The mandrel 60 moves the can upwardly to position B and downwardly to position A in the direction of arrow 62 and rotates the can in the direction of arrow 64 at least once in either desired position. When the mandrel 60 is lowered during a first time period, the can is at position A and an optical surface profile is generated by the non-contact measurement apparatus 30. When the mandrel 60 is raised during a second time period, the can is at position B and contact measurements are generated by the contact measurement apparatus 20. The control 120 activates the mandrel to the desired position A or B and then rotates the mandrel under control of a stepper motor 110.

The optical components in the non-contact measurement apparatus 30 are conventional and may be of the type set forth in U.S. Pat. No. 4,863,275. The present invention, however, improves upon the teachings of the '275 patent. Essentially, the camera 32 receives a shadow of the edge of the can 40 when the can is in position A and delivers digitized pixel information corresponding to the shadow's edge over lines 34 to the video frame grabber 36. The shadow is created from light generated by light source 33 which is part of the non-contact measurement apparatus 30. The video frame grabber 36 delivers the digitized information for the shadow's edge onto bus 52 for delivery into the computer 50 for processing. The computer 50 is a personal computer such as the IBM 386 AT series computer. The light source 33 for generating the shadow edge of the can 40 as well as all the necessary focusing optics is generally shown in FIG. 1 but it is to be expressly understood that the teachings are well known based upon U.S. Pat. No. 4,863,275. The present invention provides a digital camera 32 having a higher resolution and greater noise reduction (i.e., less pixel position jitter) than the system of the '275 patent. The present invention uses a digital output CCD camera such as Model 4110 manufactured by Cohu Inc., 5755 Kearny Villa Road, P.O. Box 85623, San Diego, Calif. 92138.

The digitized data generated over bus 52 from the non-contact measurement apparatus 30 produces information for a three dimensional surface profile map 12 wherein the first dimension E comprises a predetermined number of elevational locations vertically up the sidewall of the can 40, a second dimension C comprises a predetermined number of sample locations equally spaced around the circumference of the container and a third dimension R comprises the sidewall radii. Hence, a three dimensional map 12 of the entire surface area of the sidewall of the can 40 can be created from the digital data delivered over bus 52 during the first time interval to the computer 50 when the can is in position A and is fully rotated. This provides a three dimensional map 12 of the surface profile of the outer surface of the can 40 where, in the preferred embodiment:

E=440 locations along the elevation
C=128 positions around the circumference
R=radial dimension at outer surface.

In the preferred embodiment, 56,320 separate measurements (440×128) of R are made for each can and are delivered over bus 52 to the computer 50. It is to be expressly understood that any suitable number could be used and that the invention is not to be limited by the above values.

The contact measurement apparatus 20 of the present invention includes a plurality of LVDTs (linear variable differential transformers) 80. Each LVDT 80 interacts with a mechanical contact apparatus 84 to mechanically contact various locations on the sidewall of can 40 to provide sidewall thickness measurements at a plurality of circumferential locations on the can 40. The contact apparatuses 84 are mechanically in contact with the LVDTs 80 as shown by dashed lines 81. The LVDTS 80 are electrically connected to an LVDT interface 90 which in turn delivers the contact measurements into a multiplexer 100 over lines 92. In addition, a stepper motor 110 rotates the can 40 under commands from the control 120 over lines 112. The mandrel 60 is activated by control 120 over lines 122 which is also connected to computer 50 over lines 123. Finally, stepper motors 131 position the apparatuses 84 along the can's elevation, under control of control 120 via electrical connection 133. Each apparatus 84 along the sidewall of the can is connected to a separate stepper motor 131 over mechanical linkage 135. The multiplexer 100 interconnects with an analog to digital (A/D) converter 130 over lines 102. The A/D converter 130 in turn delivers digital data to bus 52 and computer 50. Hence, each contact apparatus 84 along the sidewall separately (1) adjusts to a desired elevation under control of a stepper motor 131, (2) becomes activated to perform measurements under control of an actuator 124, and (3) engages its own LVDT 80 to deliver the measurements.

The system 10 of the present invention as shown in FIG. 1 operates in the following general fashion. The system 10 provides both contact measurements from apparatus 20 and non-contact measurements from apparatus 30 for the can 40. This is accomplished by having the mandrel 60 selectively raised to position B and lowered to position A by computer 50 through control 120. In the lower position A, can 40 is positioned within the optical train of the non-contact measurement apparatus 30. As set forth in U.S. Pat. Nos. 4,872,757 and 4,863,275, measurements of the shadow edge are made for one rotation 64 of the can 40 during a first time period.

After the non-contact measurements have occurred, the can 40 is raised to position B under command of control 120 by the mandrel 60 in the direction of arrow 62 so that the contact measurement apparatus 20 can generate sidewall thickness and can height measurements based upon contact. A number of mechanical contact apparatuses 84 engage the can 40 when the mandrel 60 is raised. Each mechanical contact apparatus 84 is mechanically in contact with LVDT 80 which in turn is electrically connected to the LVDT interface 90. When the can is raised into the contact measurement position B, the contacts 84 are released through a pneumatic actuator 124 so that contact with the can is made. The actuators are mechanically linked 88 to each contact 84. The can 40 is then rotated and each mechanical contact apparatus 84 measures sidewall thickness a predetermined number of times during a rotation 64.

In the preferred embodiment for apparatus 20 (not shown in FIG. 1), six separate mechanical contact apparatuses 84 are utilized. Three contact apparatuses 84 measure the sidewall thickness at three different height locations on the can 40, one contact apparatus measures the overall height of the can, one contact apparatus measures the overall dome height of the can, and one contact apparatus measures reference height. A three dimensional sidewall thickness map 14 is generated from the data delivered on bus 52 from the apparatus 20 with thickness values at predetermined elevational locations vertically up the sidewall of the can (i.e., first dimension, E), at equally spaced locations around the circumference of the can, (i.e., second dimension, C) and, of course, the thickness values (i.e., the third dimension, T). In the preferred embodiment, the following values are used:

E=3 locations along the elevation
C=128 positions around the circumference

T=Wall thickness.

In the preferred embodiment, 384 separate measurements (3×128) of T are made for each can and are delivered over bus 52 to the computer 50. It is to be expressly understood that any suitable numbers could be used and that the invention is not to be limited by the above values.

Each sidewall thickness measurement is obtained through a unique balanced double-pivot scissors mechanism which will be discussed in greater detail later. The balanced double-pivot scissors arrangement is mounted on a first pivot to permit the scissors free rotation and to accommodate varying sidewall thicknesses of the can. The second pivot permits the arms of the scissors to follow varying radial diameters due to any eccentric shape of the can as will be explained later.

After the sidewall measurements are obtained, the mechanism contacts 84 are opened and the can 40 is lowered and the computer 50 processes the three dimensional sidewall thickness data 14 from the contact measurement apparatus 20 and correlates it with the three dimensional surface profile data 12 obtained from the non-contact measurement apparatus 30 so as to provide a solid model sidewall profile 16 for the can 40. This solid model 16 is generated as output 70 shown in FIG. 1 and has E=Elevation, C =Circumference, R=Surface Radius, and T=Sidewall Thickness relative to surface radius. Squarity, ovality, diameter, and tilt with respect to center of the can are determined from the data produced by apparatus 30. The output 70 from the computer 50 can be in any convenient form such as graphical, tabulated, screen display, transmission to a central computer, or the like.

2. Electronics for Contact Measurement Apparatus 20

In FIG. 1, conventional LVDTs 80 are utilized. These are commercially available from Schaevitz, U.S. Route 130 and Union Avenue, Pennsauken, N.J. as the Linear Contact Bearing series gauge head. As will be discussed subsequently, in the preferred embodiment six mechanical contact apparatuses 84 and six LVDTs 80 are provided. However, it is to be expressly understood that the teachings of the present invention could be applied to any suitable environment wherein more or less than six contact apparatuses 84 and six LVDTs 80 are provided.

Figure 2:
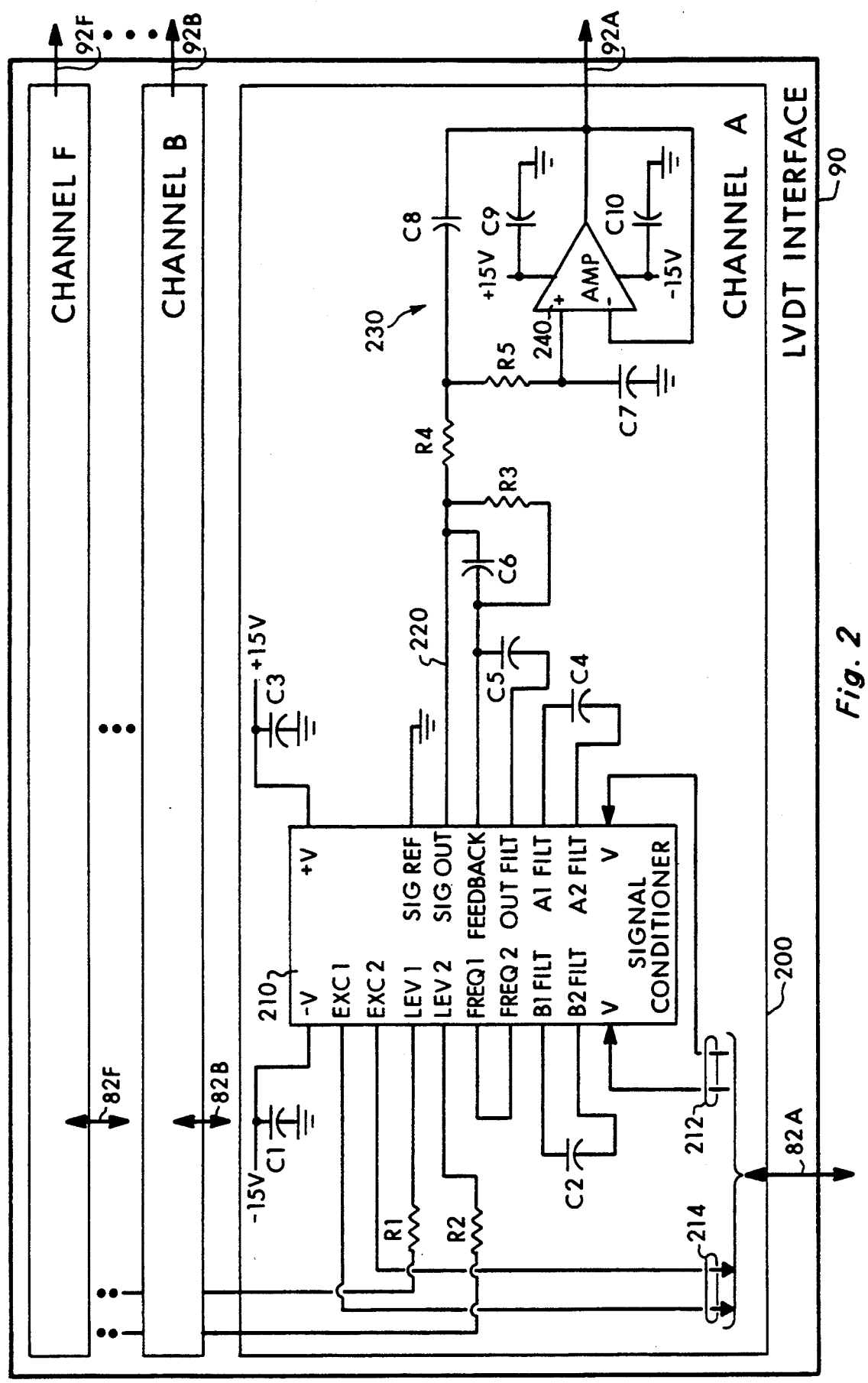
FIG. 2 is a detailed schematic of one channel in the LVDT interface of the present invention.

In FIG. 2, the details of only one circuit channel in the LVDT interface 90 are set forth. As mentioned, any number of channels could be used. There are six channels in the preferred embodiment with each circuit of FIG. 2 being dedicated to one channel. Hence, in the preferred embodiment outputs 92A through 92F are delivered to the multiplexer 100 based upon six inputs 82A through 82F.

Each channel 200 utilizes a signal conditioner 210 which is conventionally available from Analog Devices as Model No. AD598. These are monolithic Linear Variable Differential Transformer (LVDT) signal conditioning sub-systems which are utilized to convert transducer mechanical positions to unit polar or bipolar DC voltages with a high degree of accuracy and repeatability.

In FIG. 2, the signal conditioner 210 is shown interconnected according to the design requirements of the present invention. The signals on lines 92 from the LVDT interface 90 correspond to signals proportional to LVDT mechanical displacement. The signals received on lines 212 are the actual sidewall thickness and can height signals from the mechanical sensors 84 and lines 214 deliver the excitation current necessary to operate the LVDT 80.

In FIG. 2, the LVDT 80 is excited with current over lines 214 and the signal proportional to the degree of thickness or height measured on the can is delivered back over lines 212 into the signal conditioner 210 as a voltage V signal. The resistors R1 and R2 and the capacitors C1 through C6 are utilized in a conventional fashion to configure the signal conditioner 210. The values of resistance and capacitance are used to change the range for measuring thickness. The signal output from the signal conditioner is delivered on line 220. A resistor R3 is used to set the gain of the signal conditioner 210. The output signal on line 220 is delivered through resistor R4 into a low pass filter 230 which is based upon an operational amplifier 240. The operational amplifier is preferably a Model OP77 manufactured by Precision Monolithics Inc., 1500 Space Park Dr., Santa Clara, Calif. 95052. The resistors R4 and R5 as well as capacitors C7 through C10 provide the necessary low pass frequency range of the filter which serves as a ripple filter. The pass band of the filter 230 is zero to 2.25 KHz. The output of the operational amplifier 240 is delivered on line 92A into the multiplexer 100.

In the preferred embodiment, six channels (A through F) are utilized and the circuitry for each channel corresponds to the circuitry shown for channel A of FIG. 2. It is to be expressly understood that any suitable circuit arrangement could be utilized to condition the output of the LVDT 80 (FIG. 1) for delivery into the multiplexer 100 (FIG. 1) under the teachings of the present invention and the scope of the present invention is not to be limited to the precise circuit shown in FIG. 2. In the preferred embodiment shown in FIG. 1, the A/D converter 130 and the multiplexer 100 are combined into one circuit commercially available from Analog Devices as Model RTI-800. The measurements delivered from the contact measurement apparatus 20 are delivered into the computer 50 over bus 52.

In operation, each time the can 40 needs to be rotated by the mandrel 60, the stepper motor 110 receives a series of input signals on line 112 from control 120 which are delivered from computer 50 over lines 123.

3. Mechanical Contact Apparatus 84

Figure 3:
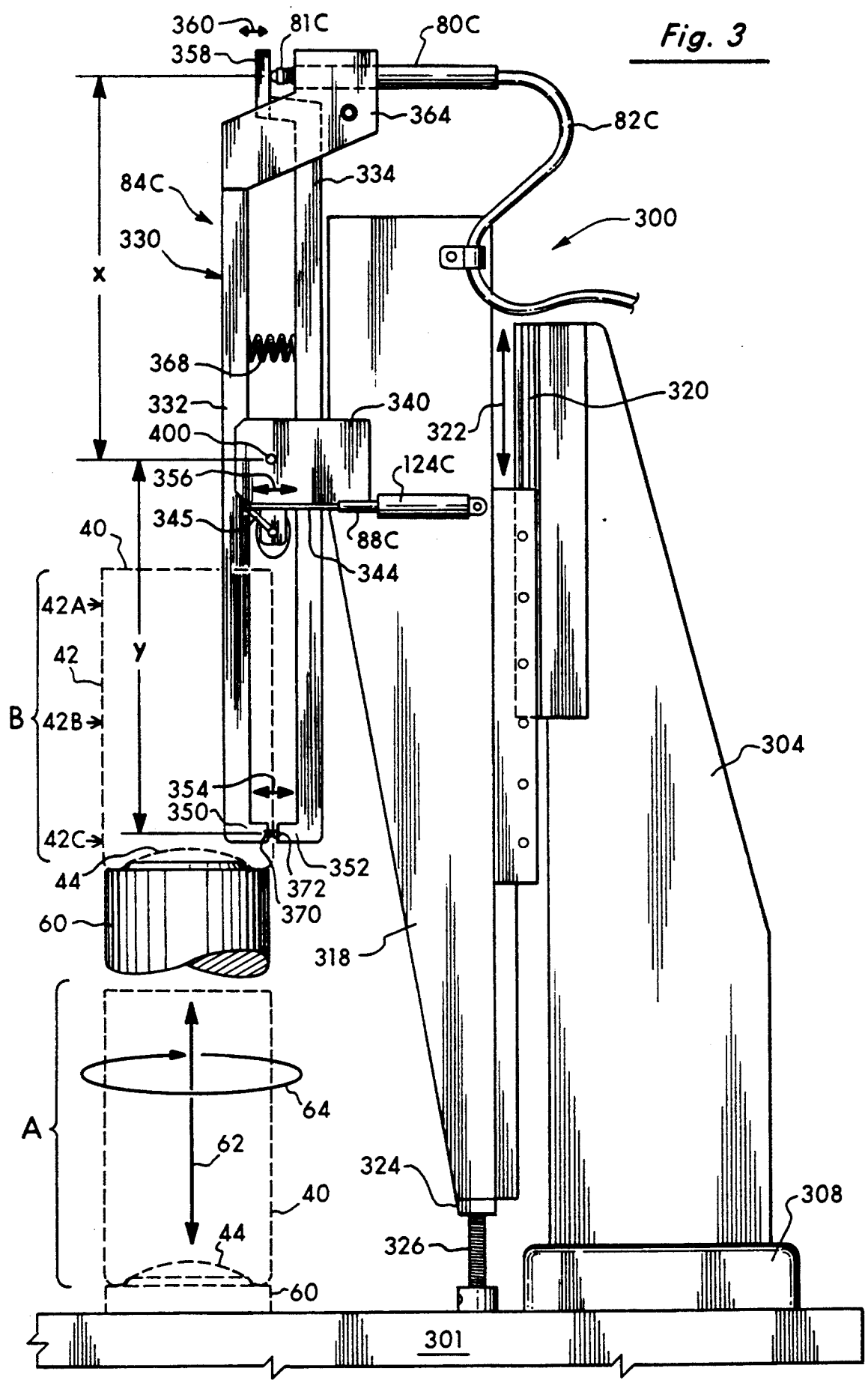
FIG. 3 is a side planar view of a single-contact sidewall measurement apparatus of the present invention.

In FIG. 3, the mechanical components of the contact apparatus 84 are shown engaging can 40 which is in the raised position B. As previously discussed, the mandrel 60, in a conventional fashion, selectively raises and lowers the can 40 in the direction of arrow 62 from position A to position B. When in position A or B, the mandrel 60 rotates the can in the direction of arrow 64. The operation of the mandrel 60 in raising and lowering the can 40 and in rotating the can is conventional and well known.

Figure 18:
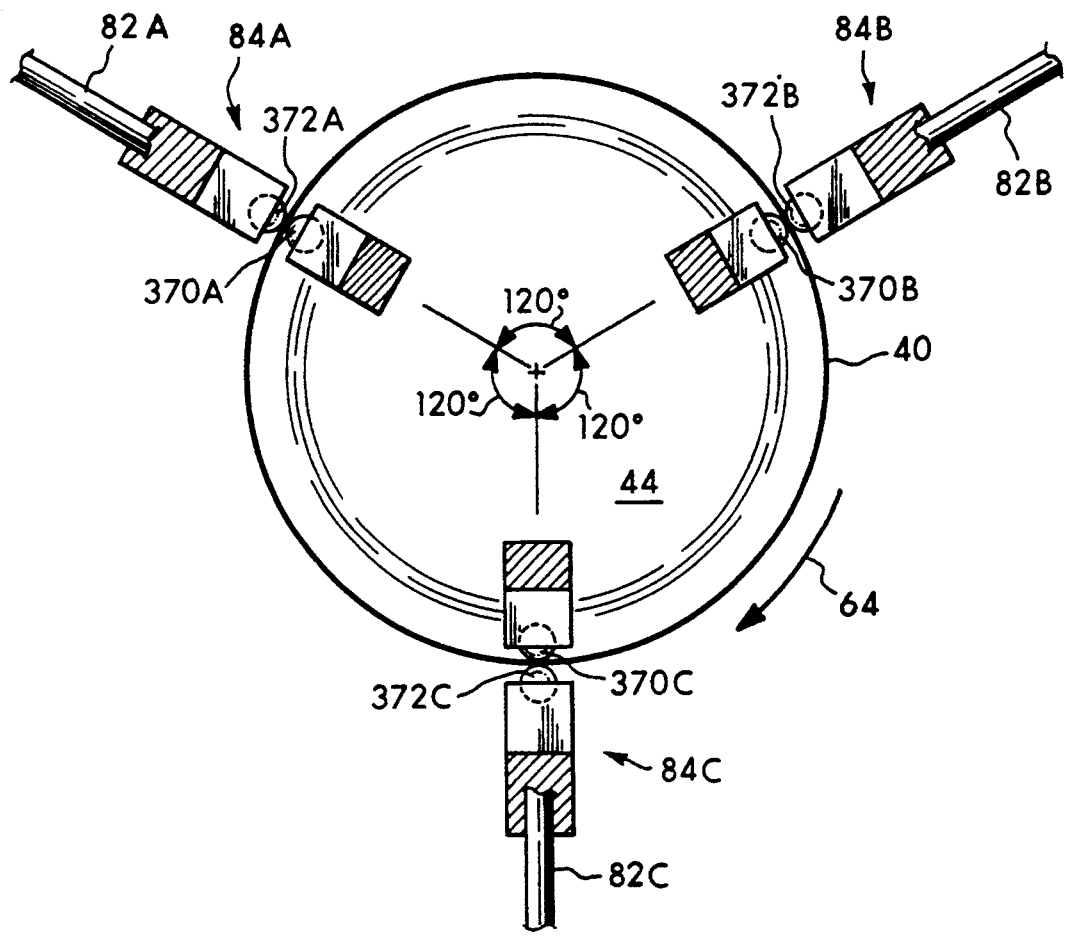
FIG. 18 sets forth the spaced relationship of the sidewall measurement apparatus about the circumference of a container.

In FIG. 3 a single sidewall mechanical contact apparatus 84C is illustrated. In the preferred embodiment, three separate sidewall contact apparatuses 84 are used. This is more fully illustrated in FIG. 18. FIG. 18 is a top view of can 40 looking into the bottom 44 of the can.

In FIG. 18, the three mechanical contact apparatuses 84A, 84B, and 84C are shown disposed evenly around the can 40 at 120 degree intervals. Hence, as the can is rotated in the direction of arrow 64, each LVDT 80A, 80B, and 80C measures sidewall thickness and delivers electrical signals over its respective output lead 82A, 82B, and 82C. As shown in FIG. 18, the three mechanical contacts are equally spaced (i.e., 120°) from each other and, as shown in FIG. 3, the measurements occur at different elevation positions on can 40 (i.e., 42A, 42B, and 42C). It is to be expressly understood that the present invention is not to be limited to the use of three sidewall measurement contacts 84 and that any number could be used in a particular design environment. For example, if four measurements were to be made of the sidewall thicknesses of the can, then the four contacts 84 would be spaced around the can. Furthermore, it is to be also understood that the invention is not to be limited by equal spacings in degrees about the container 40 or by the value of the spacings along the elevation of the sidewall. For example, three mechanical contacts 84 and their corresponding LVDTS 80 could be clustered on one side of the container and spaced from each other at 20° intervals. Whatever the design requirement for a particular measurement situation, the present invention can be suitably adapted.

In FIG. 3, a support 300 comprises a base 301 to which a vertical support 304 is attached. Vertical support 304 is conventionally mounted to base 301 by means of a mount 308. The vertical support 304 is rigid with respect to the base 301. On the upper end of the vertical support 304 is placed a standard slide 320 and affixed to it is adjustable support arm 318. Hence, the adjustable support arm 318 slides up and down the fixed support arm 304 in direction of arrow 322. The lower end 324 of the adjustable support arm 318 has an adjustment thread 326 through a threaded bottom base 324. Turning of the adjustment thread 326 in nut 324 (which is affixed to base 301) in the appropriate direction by a stepper motor 131 causes the adjustable support arm 318 to move upwardly along the slide 320 as shown by arrow 322. The threaded screw 326 is of sufficient length and the slide 320 is of sufficient length to position its attached sensor 84 to any desired location along the elevation of sidewall 42 of the can 40.

Furthermore, the adjustment of the adjustable support arm 318 by means of turning adjustment thread 326 can be accomplished either manually or, in the preferred embodiment, automatically under control of computer 50 through control circuit 120 over line 133 shown in FIG. 1. In the preferred embodiment, the stepper motor 131 is connected to the screw 326 to rotate the screw in discrete steps generating the motion 322. It is to be understood that any suitable means for achieving rotation could be used.

It is to be expressly understood that the configuration of the support 300 having the fixed support arm 304 and the adjustable support arm 318 can be of any desired configuration provided that rigid support is provided with respect to the base 301. Furthermore, it is to be expressly understood that the design of the slide 320 can be any suitable sliding relationship provided that the slide has very little mechanical play.

Firmly attached to the adjustable support arm 318 is mechanical contact apparatus 84 which comprises the scissors 330 and a double-pivot mechanism 340. Scissors 330 have an inner arm 332 and an outer arm 334. Midway between the arms 332 and 334 is the double-pivot mechanism 340. The double-pivot mechanism 340 is rigidly mounted to adjustable support arm 318. A pneumatic cylinder 124C has a plunger 88C which selectively moves to cause the ends 350 and 352 of arms 332 and 334 to open and close in the direction of arrow 354. The movement of the plunger 344 is shown by arrow 356. The opening and the closing of ends 350, 352 is smooth so as to prevent any impact or chattering onto the surface of the sidewall 42 of can 40. The double-pivot mechanism 340 uses a single pivot pin 400 as will be discussed later.

At the upper end of arm 332 is attached a clamping plate 364 to which LVDT sensor 80C is rigidly held in the position as shown in FIG. 3. Hence, the LVDT 80C is firmly held by housing plate 364 to arm 332 and the sensor LVDT 80C is referenced against the upper end 358 of the inner arm 334. Hence, as the upper end 358 of arm 334 moves in the direction of 360 relative to arm 332 it pushes the sensor 80C on arm 332. The LVDT 80C obtains an accurate measurement of this movement. A spring 368 provides constant pressure to contacts 370 and 372 against sidewall 42.

Opposing contacts 370 and 372 are placed in the lower ends 350 and 352 of arms 332 and 334 on opposite sides of the sidewall 42. The design of these contacts 370 and 372 will be discussed in greater detail subsequently.

The general operation of FIG. 3 will now be discussed. When the can 40 is in position A, the ends 350 and 352 of the contact measurement apparatus 84 are opened through action of the cylinder 124C. Hence, a gap, not shown, exists between contacts 370 and 372. The mandrel 60 lifts the can 40 upwardly in the direction of arrow 62 so that the sidewall 42 travels between opened contacts 370 and 372. Once the can is in position B, the computer 50 causes the control 120 to activate actuator 124C to close the ends 350 and 352 so that the contacts 370 and 372 carefully abut opposing sides of the sidewall 42. Once closed, the contacts 370 and 372 engage the sidewall 42 to perform contact measurements of sidewall thickness. The linear position of LVDT 80C corresponds to the sidewall thickness, T, of the can. The can is rotated in the direction of arrow 64 and a number of predetermined measurements (by either "indexing" or "sliding" the contacts 370, 372 as will be discussed later) are made as the can is rotated. The sidewall measurement signals are converted from mechanical signals into analog electrical signals by the LVDT 80C and delivered over lines 82C to the corresponding channel (which for FIG. 3 is channel C) as shown in FIG. 2.

The dimensions X and Y of FIG. 3 are made equal so that temperature changes causing thermal expansion of the scissors have no effect on the measurement. Any temperature changes in the surrounding environment would equally affect the "X" and "Y" portions of the balanced scissor mechanism (i.e., equally contract or expand each portion) so as to prevent errors from being introduced into the sidewall measurements and to preserve balance. This is critical to factory floor operation and is an important feature of this invention.

It is to be expressly understood that the contact apparatus 84 of the present invention could be implemented in a number of different configurations and that FIG. 3 sets forth only the preferred approach.

4. Double-Pivot Mechanism 340

The details of the double-pivot mechanism 340 for the balanced scissors 330 of the present invention are shown in FIGS. 4, 5, 6, and 7.

Figure 4:
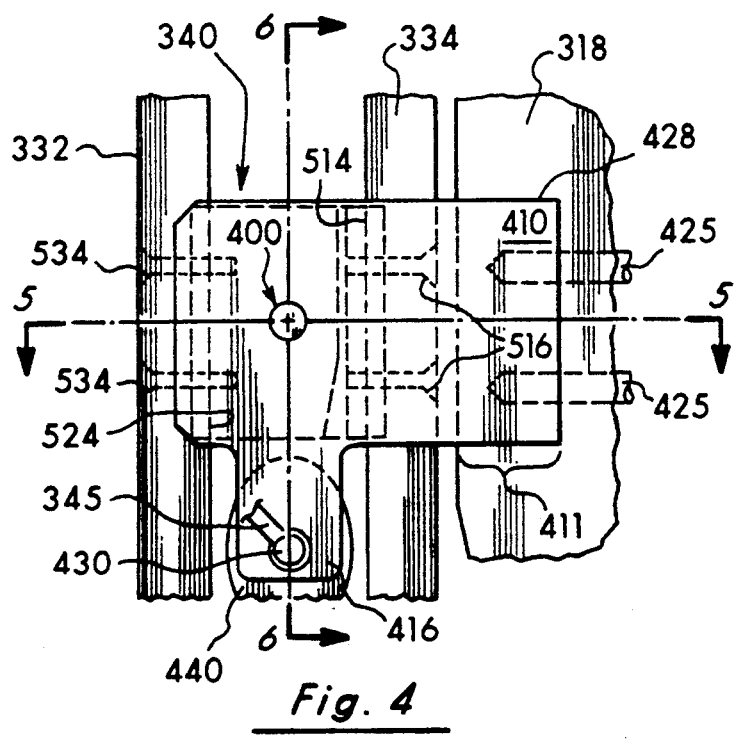
FIG. 4 is a side planar view of the balanced double-pivot scissors mechanism of the present invention.
Figure 6:
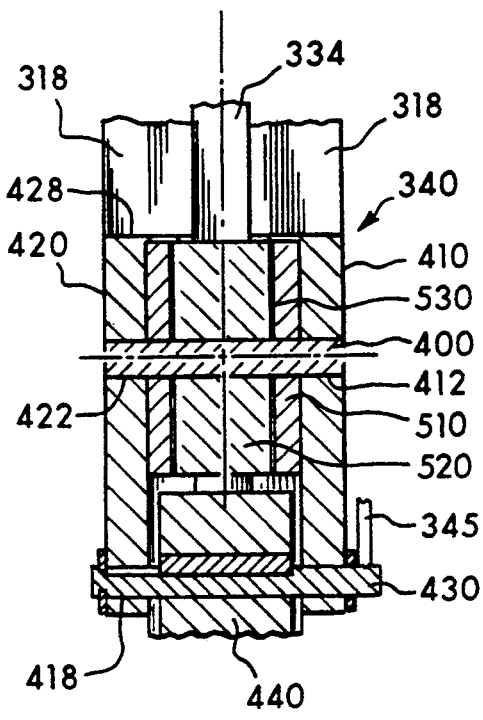
FIG. 6 is a cross-sectional view of the balanced double-pivot scissors mechanism of the present invention along line 6—6 of FIG. 4.
Figure 7:
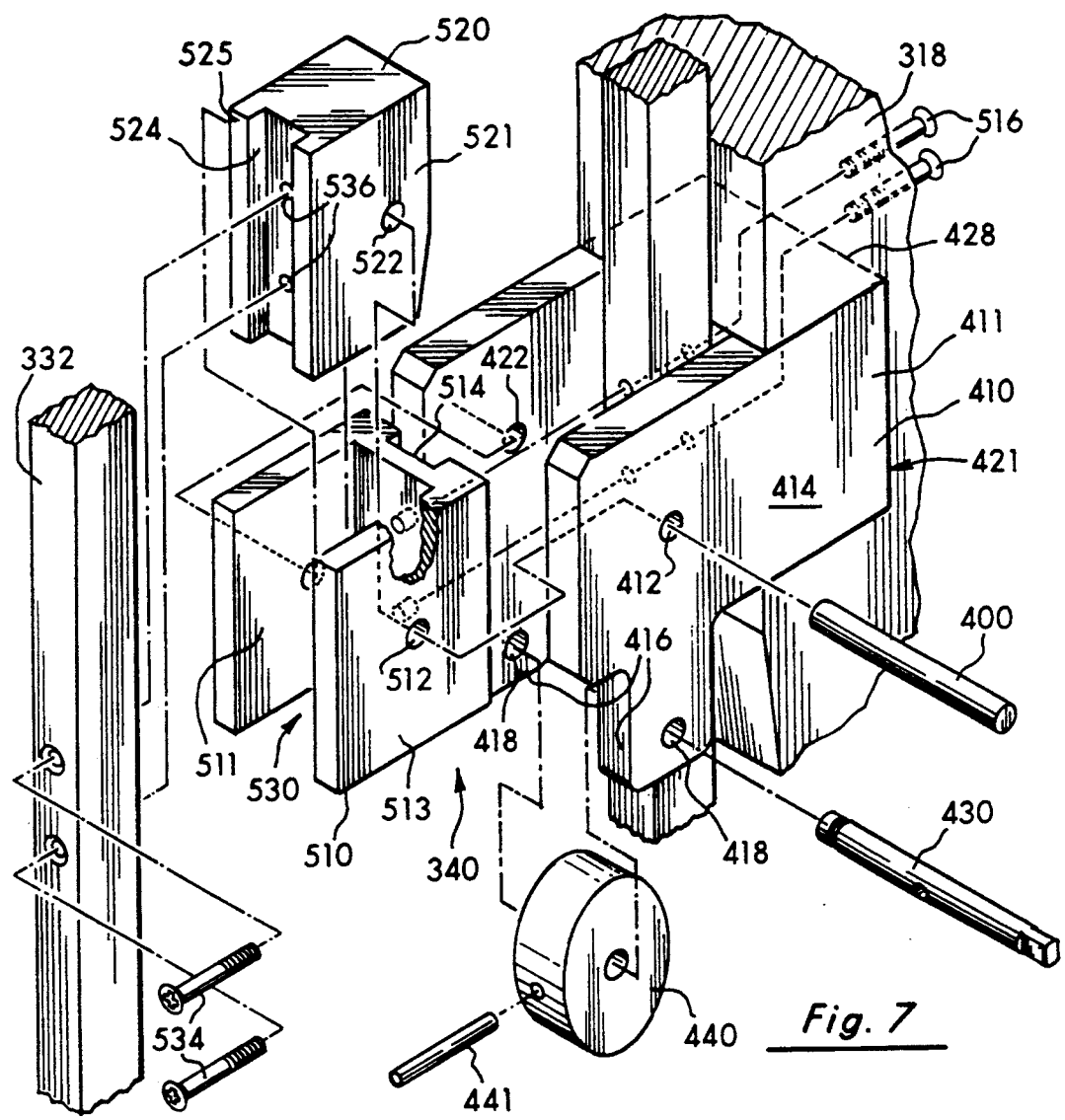
FIG. 7 is an exploded perspective view of the balanced double-pivot scissors mechanism of the present invention.

The double-pivot mechanism 340 has a pivot pin 400 which is placed through a first outside plate 410 and a second opposing outside plate 420 which are part of an integral clevis 421. Outside plates 410 and 420 have formed holes 412 and 422 through which the pivot pin 400 passes. In the preferred embodiment, each outside plate 410,420 has a substantially rectangular body portion 414 with a downwardly extending rectangular shaped lower protrusion 416 as shown in FIG. 7. Protrusion 416 has a formed hole 418. A second pivot pin 430 passes through formed holes 418 to firmly hold a cam 440 in place between the two downwardly extending protrusions 416 of clevis 421. This is shown in FIGS. 4, 6, and 7. The cam 440 is a simple open/close mechanism for pushing apart ends 350 and 352 of arms 332 and 334 in the direction of arrow 354. As shown in FIG. 3, actuator 124C is coupled 88C to a pivot arm 345 which pivots about pin 430 to turn the eccentric cam 440 so as to engage arms 332 and 334. The pivot pin 430 is locked to the cam 440 with key 441. It is to be expressly understood that other mechanisms for causing the ends 350 and 352 of arms 332 and 334 to open and close can be utilized under the teachings of the present invention although the use of an eccentric cam 440 is preferred.

The rearward end 411 of clevis 421 engages a formed channel 428 in adjustable support arm 318 as shown in FIGS. 4, 6 and 7. The clevis 421 is firmly attached in channel 428 by means of bolts 425.

Figure 5:
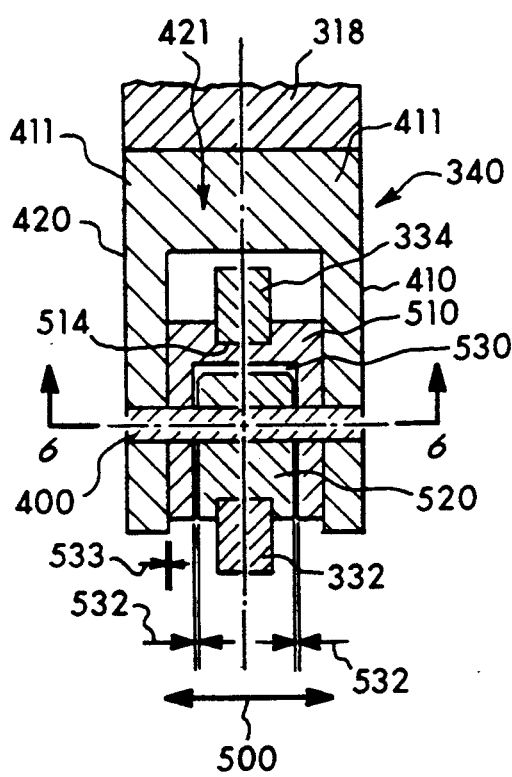
FIG. 5 is a cross-sectional view of the balanced double-pivot scissors mechanism along line 5—5 of FIG. 4.

As more clearly shown in FIGS. 5, 6, and 7, also disposed between the two outer support plates 410 and 420 of clevis 421 is a first pivot housing 510 and a second pivot housing 520. Both housings 510 and 520 have formed holes 512 and 522 through which the pivot pin 400 passes. Each pivot housing 510 and 520 is capable of pivoting about the pivot pin 400 independently of each other.

The first pivot housing 510 is attached to outer arm 334. A formed channel 514 is machined to slidingly engage around arm 334 as shown in FIG. 5. Screws 516 are utilized to firmly attach the arm 334 to the first pivot housing 510. Hence, the first pivot housing 510 is firmly attached to the arm 334 wherein the arm 334 fits within the machined channel 514.

The second pivot housing 520 fits within a large U-shaped channel 530 machined within the first pivot housing 510. The second pivot housing 520 is substantially rectangular in shape having an elongated channel 524 machined on the forward surface 525 of the housing 520. The shape of the second pivot housing 520 is such that it fits within the U-shaped channel 530 of the first pivot housing 510 so that the clearances between the housing 520 and the pivot housing 530 are shown by arrows 532 of FIG. 5 to be a total (i.e., on both sides) of 0.0001 inch. The inner arm 332 fits within the machined channel 524 of the second pivot housing 520 and is firmly connected thereto by means of screws 534 which selectively engage formed threaded screw holes 536. Again, the second pivotal housing 520 rigidly engages inner arm 332.

The pivot pin 400 is located in the approximate center of arms 332 and 334. The exact location is not critical since the balanced double-pivot scissors mechanism 330 uses weight distribution to achieve balance. Balance occurs when a vertical center line drawn through the pivot pin 400 also passes between the closed contacts 370 and 372 and the contact between the LVDT sensor 80 and the inside edge of the extension 358 of arm 334. This is illustrated in FIG. 15.

In FIG. 15, assume that the can 40 is not present and that the contacts 370 and 372 touch each other. In this case the vertical center line 1540 passes through the center of pivot pin 400. Balance is achieved when the weight of the scissors 330 is distributed so that when the contacts 370 and 372 touch each other, this vertical center line 1540 also passes between the end of LVDT 80A and the inner edge of lip 358. Hence, the weight of scissors 330 is properly distributed to achieve this vertical alignment.

5. Operation of the Balanced Double-Pivot Scissors Mechanism 340

In FIGS. 14 through 16 the operation of the present invention is shown.

In FIG. 14, the cam 440 has been activated by the actuator 124A to open ends 370 and 372. Actuator 124A is under control of computer 50 via control 120. The opening of the scissors 330 is shown by arrow 1400 and it is to be noted that end 358 of arm 334 has moved in the direction of arrow 1410 away from sensor 80A. In this position, the mandrel 60 can move the can 40 in the direction of arrow 62 from position A to position B. During this "load" mode of orientation, a physical spacing of approximately ⅛ inch between contacts 370 and 372 exists.

Once loaded, the actuator 124A moves the cam 440 into a position to close contact 370 against the inner surface 1500 of sidewall 42 and contact 372 against the outer surface 1510 of sidewall 42 as shown in FIG. 15. The pressure of the contacts 370 and 372 against the sidewall 42 is sufficient to properly take sidewall thickness measurements but without altering or affecting the shape of the sidewall 42. Hence, FIG. 15 shows the mechanism 330 closed to "measure" sidewall thickness. Arrows 1520 show the closure of the arms 332 and 334. Note that end 358 now abuts LVDT 80A. Hence, end 358 has moved in the direction of arrow 1530 to abut against LVDT 80A.

FIGS. 14 and 15 illustrate the first "pivoting" motion of the present invention. That is, the arms 330 and 334 pivot about pivot pin 400. The first pivot action on pin 400 results in movement between housings 520 and 510 of the double-pivot mechanism 340. The first pivot action occurs with the inner pivot housing 520 pivoting about pin 400 in the formed channel 530 of housing 510. As mentioned, the first pivot action is limited to the maximum opening between contacts 370 and 372 for loading as illustrated in FIG. 14. This open and close action is under control of actuator 124A.

The second pivoting action about pin 400 also occurs under the teachings of the present invention. This pivoting action about pivot pin 400 provides movement between housing 510 and clevis 421. Clearance between these two components is shown in FIG. 5 by arrows 533 and in the preferred embodiment the total clearance is 0.0001 inch. This second pivoting action about pin 400 is illustrated in FIGS. 15 and 16. FIG. 16 is highly exaggerated but the exaggeration best illustrates this second pivoting action. Can 40 for whatever reason is off true center 1600. True center 1600 is the center of the mandrel 60 which would correspond to the center of an ideal can 40 which is concentric with the mandrel 60. However, in FIG. 16, the can 40 is tilted, oval-shaped or out-of-round. In FIG. 16, the tilted can 40 is shown by the difference 1620 between the center axis 1600 of the mandrel 60 and the center line 1610 of the can at the point of measurement.

If the scissor 330 of the present invention could not compensate for such eccentricity in the can, then deflection to the can 40 would occur during sidewall thickness measurement. As the can is rotated in the direction of arrow 64 by the mandrel 60, the entire end 1630 of the scissors 330 must freely move to accommodate for the out-of-roundness. That is, the end 1630 must track, as shown by arrow 1640, the out-of-roundness of the can. As the end 1630 tracks 1640 the out-of-roundness of the can based upon varying radial diameters, the end 1630 of the scissors 330 moves in a direction of arrow 1640. Hence, the second "pivoting" action of the present invention permits the sidewall thickness measurements to occur even though the can has out-of-roundness (i.e., different radial diameters).

The second "pivoting" action must freely occur and, therefore, the clearances 533 (FIG. 5) are such so as to permit free movement. Hence, the first pivoting action must occur and remain unaffected in the presence of the second pivoting action.

It is to be expressly understood that different mechanical designs could be utilized for the double-pivot mechanism 340 of the present invention which is detailed in FIGS. 4 through 7. It is to be expressly understood that any suitable mechanical design that accomplishes the dual pivoting function of the present invention as specifically set forth in FIGS. 14 through 16 could be utilized without departing from the spirit and scope of the present invention. The first pivoting action opening and closing contacts 370 and 372 measures the sidewall thickness of the can. The second pivoting action accommodates for varying radial diameters of the can so as not to cause deflection while conducting the sidewall measurements. The actuator 124 and can sidewall thickness variations causes the first pivoting action to occur whereas the out-of-roundness of the can causes the second pivoting action to occur. Of necessity, the second pivoting action is designed to easily occur when such second pivoting action is caused by the rotating can 40 itself whereas the first pivoting action is mechanically achieved through action of a cam 440 or the can sidewall variations.

6. Contacts 370, 372

Figure 17:
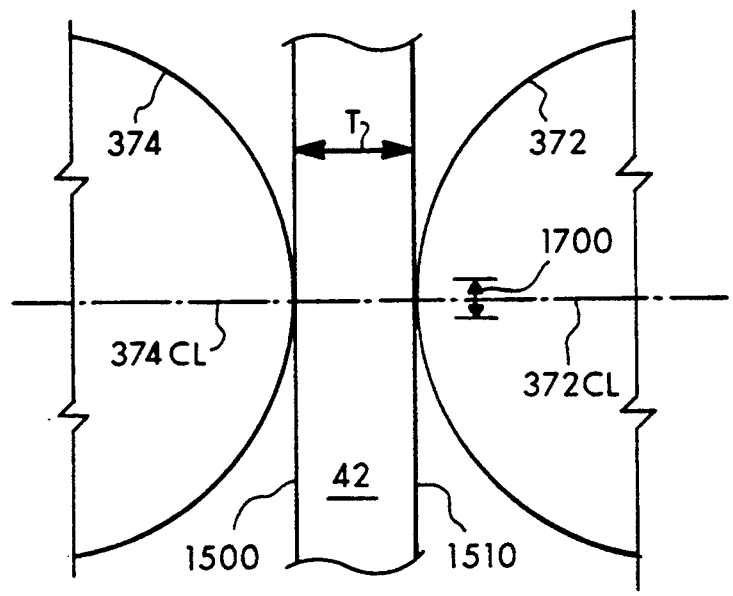
FIG. 17 is an illustration showing the alignment of the contacts of the present invention with respect to the sidewall of a container.

The contacts 370 and 372 of the present invention are illustrated in FIGS. 8 through 12 and in FIG. 17.

Figure 8:
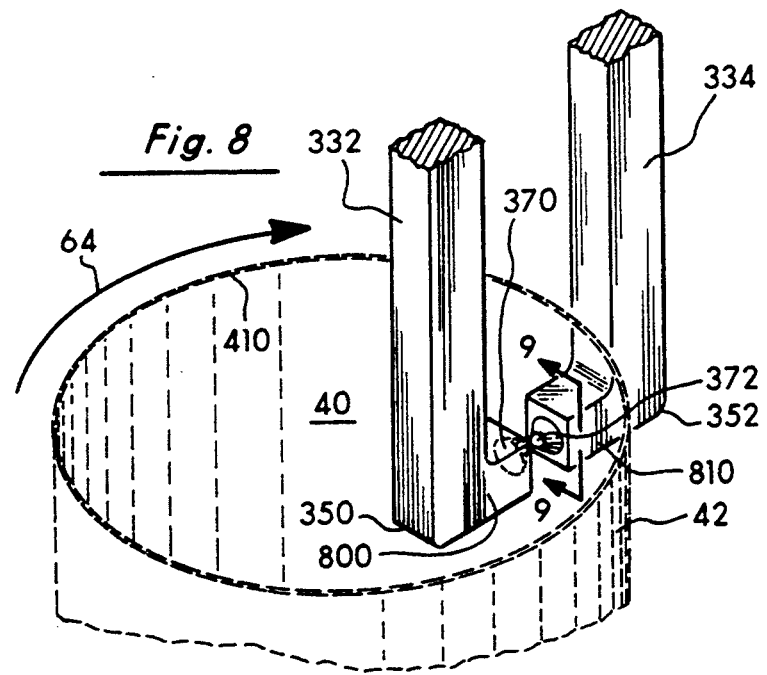
FIG. 8 is a partial perspective view of the contacts of the present invention.

As shown in FIG. 8, the can 40 is rotated in the direction of arrow 64. Each arm 332, 334 terminates in an end 350 and 352 which has a right angle protrusion 800 and 810 directed inwardly towards the sidewall 42 of the container. In the preferred embodiment, as shown in FIGS. 3 and 8, the inward protrusion 800, 810 is perpendicular to the arc, and is generally square in cross-section. Each protrusion 800, 810 terminates in a contact 370, 372.

FIGS. 9 through 12 show four separate embodiments for the contacts 370 and 372 used to track the sidewall surface. FIGS. 9 and 10 represent two embodiments of the types of contacts of the present invention which are used in an "index measurement" approach. FIGS. 11 and 12 represent two embodiments for the contacts of the present invention which are used in a "sliding measurement" approach.

The contacts of FIGS. 9 and 10 are designed to "index." In the "index" approach, as the can 40 is rotated, the ends 350 and 352 are opened by a smaller amount of distance such as 1/16″ than when opened for loading. The two contacts 372 and 370 are closed to selectively abut against the opposing surfaces of the sidewall 42. Hence, for one complete revolution of the can 40, the ends 350 and 352 open for can rotation and close a predetermined number of times corresponding to the predetermined number of measurements of sidewall thicknesses taken. Hence, the can is rotated when the contacts are opened, the contacts are closed when the can is stationary for the measurement. The "sliding" embodiments shown in FIGS. 11 and 12 on the other hand are designed to slide across the surfaces of the sidewall 42 as the can is rotated by the stepper motor 110. In this approach, the ends 350 and 352 remain closed for the entire revolution of the can and only open for loading and unloading.

In FIGS. 9 and 10, the index contacts are illustrated. In FIG. 9, the configuration of one arm 334 is shown although the configuration of the opposing arm 332 is identical in structural configuration. In FIG. 9, the end 900 is tapered to accommodate a small diameter ball 930 (i.e., about 1/16 inch diameter) which press-fits therein. The diameter of ball 930 is much less than the thickness of the tapered end. FIG. 10 uses a larger diameter ball (i.e., about ¼ inch diameter) which press-fits into a flat shaped end 1000. The diameter of ball 1010 is less than the thickness of the end. The contacts 930 and 1010 are formed of hard material such as ceramic, ruby, or tungsten carbide.

In FIGS. 11 and 12, the sliding contacts are illustrated. In FIG. 11, a more complicated contact structure is shown wherein a formed circular hole 1100 is drilled into protrusion 800, and a second hole 1110 which is threaded is coaxial with the first formed hole 1100. A threaded screw 1120 having a recessed cap head 1130 is inserted into the threaded hole 1110. A spring 1140 is placed in the first formed hole 1100. The first formed hole 1100 has an inwardly directed lip 1150 which holds contact 1160 in place. Hence, the contact 1160 is inserted through threaded hole 1110 and into formed hole 1100. The spring 1140 is then placed over the contact and into formed hole 1110 and then the screw 1120 is moved into place to a location that provides a desired amount of spring tension on contact 1160. Hence, in the configuration of FIG. 11, the contact 372 can be quickly and easily changed which is necessary because of the wear that occurs during sliding.

In FIG. 12, the second sliding embodiment is shown. Where possible, the same components of FIG. 11 carry the same reference numbers. This approach, rather than using a spherical contact 1160, utilizes a hemispherical surface 1200 having formed thereon a nipple 1210. Opposing the nipple 1210 and on the flat surface of the hemisphere 1200 is a rod 1220 which disposes through the center of the spring 1140. The purpose of this rod 1220 is to help align contact tip 1210. The contacts 372 shown in FIGS. 11 and 12 must be made of softer material and are generally made from nylon or plastic.

While four embodiments of the contacts 372 have been shown, it is to be expressly understood that any suitable design could be utilized under the teachings of the present invention so as to track the sidewall 42 of container 40. The tracking should occur in a fashion to provide accurate sidewall thicknesses without deflection or alteration of the sidewall 40 surface.

In the "indexing" approach, great care must be taken so as to close the contacts 370 and 372 for each measurement in such a fashion that the contacts 370, 372 do not impact on the surface of the sidewall 42. In this fashion, denting or chattering on the sidewall 42 is prevented. In the "sliding" approach, the contacts 370 and 372 are plastic or nylon and are therefore subject to wear. Such wear must be compensated for or erroneous measurements may result. After each can measurement occurs, and when the can is in the lower position A, the scissors 330 can be selectively closed to obtain a reference measurement which compensates for any wear to the contacts 372 and 370.

The present invention is not to be limited by the "indexing" approach or by the "sliding" approach as either approach accomplishes the claimed goals of the present invention.

In FIG. 17, the two opposing contacts 372 and 374 are shown engaging a sidewall 42 having opposing sides 1500 and 1510. Several observations are apparent. In order to have an accurate reading of the sidewall thickness T, the center lines 372CL and 374CL of the two contacts 372 and 374 should be perpendicular to the sidewall 42 and should be coaxial with each other as shown in FIG. 17. The misalignment 1700 of the individual center lines 372CL or 374CL should be within a tight range such as 0.002" spherical diameter. Hence, it is important to have a well machined double-pivot scissors mechanism 330 with tight clearances. In typical embodiments, the contact diameter is 1/16" to ¼" in diameter. It is important to maintain the clearance within the fixed range 1700 over the entire circumferential distance of sidewall measurements as the can is being rotated and while encountering varying radial diameters of the can.

7. Additional Can Measurements

Figure 13:
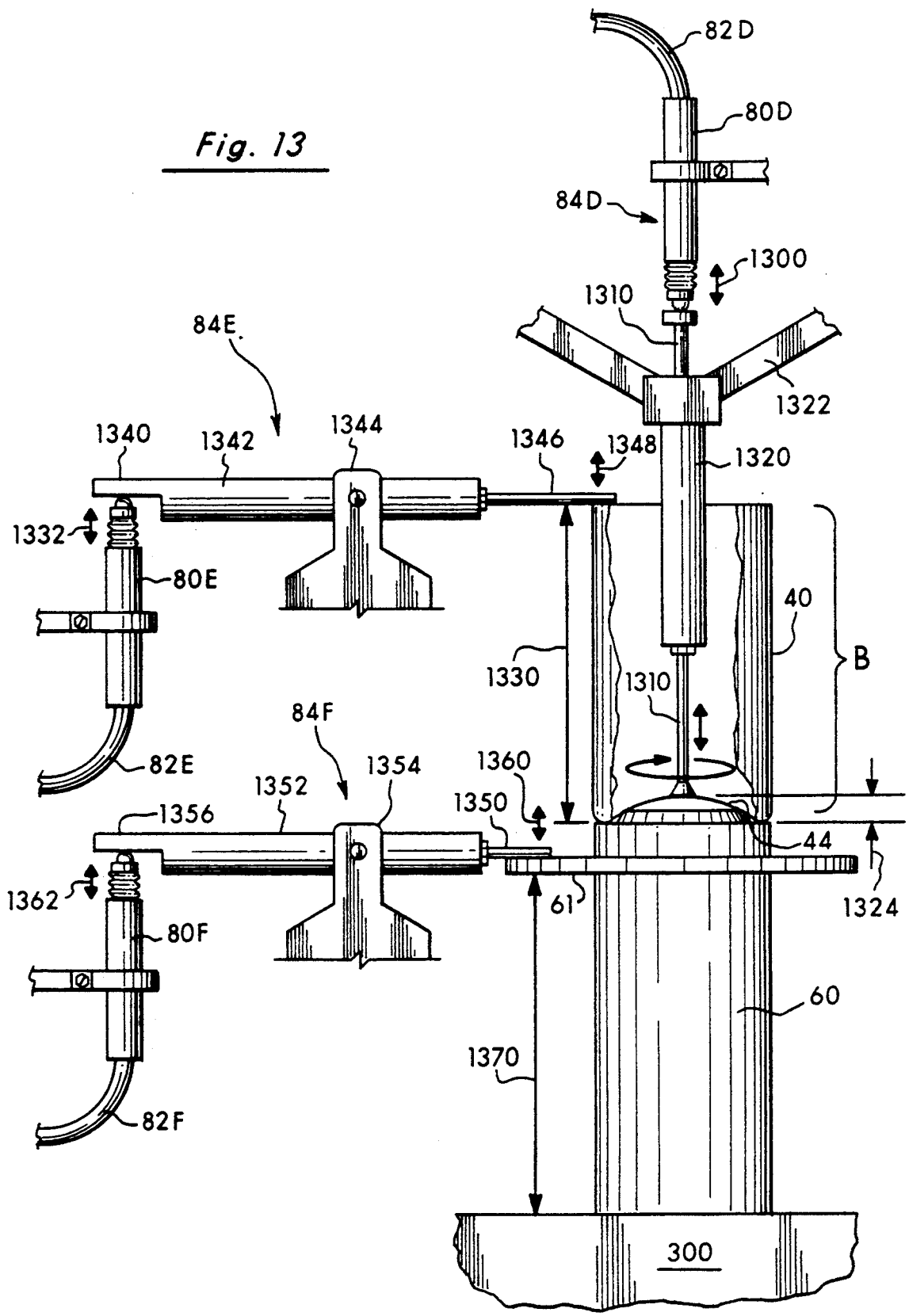
FIG. 13 is an illustration showing the measurement of the dome height, can height, and reference height.

In FIG. 13, additional measurements generated by the system of the present invention are shown. In FIG. 13, the first LVDT 80D measures the position of sensor 1310 as it moves in the direction of arrow 1300. LVDT 80D abuts sensor 1310 disposed in a cylinder 1320 which is rigidly supported 1322 with reference to base 300. An important parameter of the container 40 is the dome 44 height 1324. The cylinder 1320 and support 1322 are fixed and non-moving with respect to base 3 00 so that plunger 13 10 can accurately provide a measurement of dome height 1324. In the preferred embodiment, only one measurement of dome height 1324 is taken.

LVDT 80E provides a measurement of the overall height 1330 of the can 40. The LVDT 80E is responsive to the position of end 1340 as indicated by arrow 1332. End 1340 is part of a lever 1342 which pivots on a pivot mount 1344. The opposite end 1346 of the lever moves in the direction of 1348 which corresponds to the height 1330 of the can. The pivot mount 1344 is fixed and stable and does not move with respect to base 300. Hence, the position of lever 1342 provides a measurement of the height of the can 40. The measurement of can height 1330 continues a predetermined number of times throughout the revolution of the can.

Finally, LVDT 80F provides a reference measurement based upon physical height of the mandrel 60. The mandrel 60 has a fixed reference ring 61 which engages one end 1350 of a second lever 1352 mounted to a pivot mount 1354. The other end 1356 abuts LVDT80F. End 1350 can move in the direction of arrow 1360 which will cause a corresponding movement 1362 for LVDT 80F. The reference height measurement as shown by arrow 1370 with respect to base 300 is important for determining the true height H of the can 40. This calculation is as follows:

$$H_\theta = E_\theta - F_\theta + CF_\theta$$

where $H_\theta$ = height at given angle θ on the can circumference
$E_\theta$ = measured data from LVDT 80E
$F_\theta$ = measured data from LVDT 80F
$CF_\theta$ = correction factor from calibration map at angle θ on can circumference.

It is to be expressly understood that while three separate structural approaches have been shown in FIG. 13 to obtain additional measurements used by the system of the present invention, these and other similar measurements could also be made based on different structural approaches. In other words, the specific structural embodiments shown in FIG. 13 do not limit the scope and coverage of the present invention.

8. Master Cylinder Diameter Calibration

Figure 19:
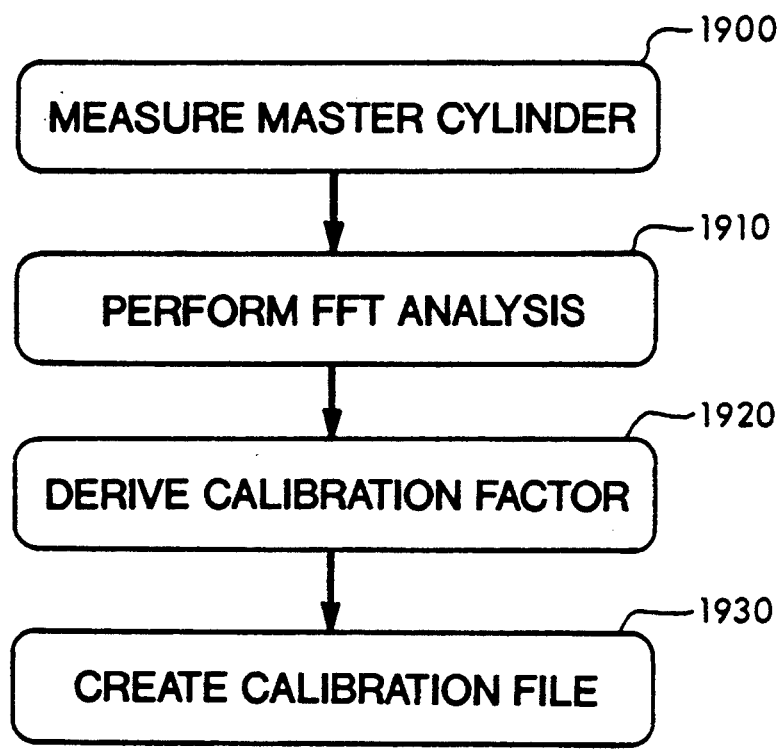
FIG. 19 sets forth the flow process for calibration to a master cylinder.

In FIG. 19, the process for calibrating the system of the present invention for a known diameter master cylinder is set forth. In stage 1900 the computer 50 of FIG. 1 causes the non-contact measurement apparatus 30 to measure a master cylinder a predetermined number of times in order to obtain an overall average. A master cylinder, not shown, of known diameter is used for calibration of the non-contact measurement apparatus 30. The shadow-edge information generated is evaluated by the computer 50 to generate a calibration topological map for R, E, and C. This master cylinder is machined to have true sidewalls representative of a perfect can and these values are known. In stage 1910, a computer 50 performs a Fast Fourier Transform (FFT) analysis on the shadow-edge data from the master cylinder to obtain the following calibration components:

a. "0" component—the radial dimension
b. "1" component—the center offset
c. "2" component—the "ovality" dimension
d. "4" component—the "squarity" dimension.

The FFT analysis generates a calibration map for the master cylinder so as to remove al 1 error incurred from a misaligned mandrel 60 center of rotation (center line 1600 in FIG. 16), mandrel tilt, and radial center of master cylinder (center line 1620). In addition, this process removes all lens and mandrel rotational error. The FFT software is conventionally available for performing the above component determinations.

In stage 1920 the calibration map is derived using the actual physical measurements of the master cylinder's diameter based on the measured and the offset values measured in stage 1910. Finally, in stage 1930 a calibration file is set up for use in calibrating all future can measurements. It is to be understood that calibration can occur at any time so as to fully compensate for any drift in the system.

9. Autozero Calibration

Figure 20:
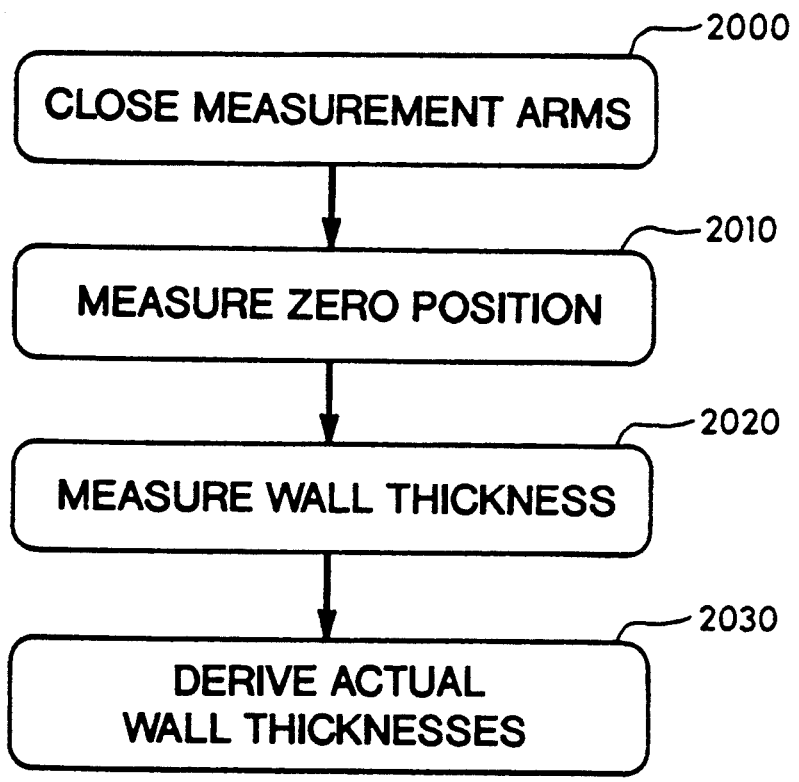
FIG. 20 sets forth the flow process for autocalibration of each of the sidewall measurement apparatuses of FIG. 3.

In FIG. 20 the process used by the computer 50 to autozero the system is set forth. In stage 2000 the measurement arms 332 and 334 are closed so that contacts 370 and 372 abut without the can 40 being involved. In other words, the contacts 370 and 372 touch each other. In stage 2010 the computer then reads the LVDTs 80A, 80B, and 80C to record their measurements at this "zero thickness" position.

In stage 2020, the system then commences to take can 40 sidewall 42 thickness measurements as shown in FIG. 15. In stage 2030, the actual wall thickness is derived. The process in FIG. 20 is straightforward. Prior to each can's measurements, the contacts 370, 372 are brought together to the "zero" thickness position. Measurements are obtained which are then used to calibrate against the actual obtained sidewall thicknesses. It is to be expressly understood that in the preferred embodiment, measurement stage 2010 occurs before the sidewall measurement in stage 2020. However, it is to be expressly understood that this autocalibration feature in stage 2100 can occur periodically (i.e., a number of cans can be measured) before autocalibration with each can as set forth in FIG. 20. Furthermore, this autozero process set forth in FIG. 20 eliminates error due to temperature changes and machine wear. Autocalibration is important when wear occurs to the contacts 370 and 372 when "sliding."

10. Shim Calibration

A master cylindrically shaped shim of known sidewall thickness is used to calibrate the contacts 370 and 372 at the maximum sidewall thickness to be measured on a can. As with the master cylinder diameter calibration discussed above, a master shim machined to be true within acceptable thickness tolerances is loaded onto the mandrel. The thicknesses of the master shim are taken and are used by the computer 50 to generate a sidewall thickness calibration factor. Similarly, a can height/dome height master is measured to generate a calibration factor for these measurements. The can height calibration factor CF is discussed in section 7 above.

11. Types of Measurement

It is useful to summarize the various measurements of the can made by the present invention. These measurements consist of:

a. Sidewall Thickness

As shown in FIG. 3 at points 42A, 42B, and 42C, three independent measurements of wall thickness at programmable (or manually set) can elevations are made at a predetermined number (such as 128) of equally spaced circumferential locations around the can 40.

b. Dome Height and Depth

The height of the dome 44 inside the can 40 relative to the base 300 is measured by LVDT 80D. The dome depth is obtained by subtracting the nominal gauge of the dome.

c. Overall Height

The overall height 1330 of the can is obtained by taking a predetermined number of measurements (such as 128) of the overall can height around the top of the can by means of LVDT 80E and 80F.

d. Surface Profile

The radial position of the can surface is obtained from the non-contact measurement apparatus 30 of the present invention and is measured at a predetermined number of radial positions (such as 128) and a predetermined number of elevations (such as 440 locations).

From this standard data set, the following data can be obtained: sidewall thickness (maximum, minimum, mean, range and elevation of each arm), overall can height (maximum, minimum, mean and range), and dome height and depth. In addition, graphical data of tilt, ovality, diameter, and squarity as a function of angle around the can and elevation can be generated.

12. Experimental Results

Figure 21:
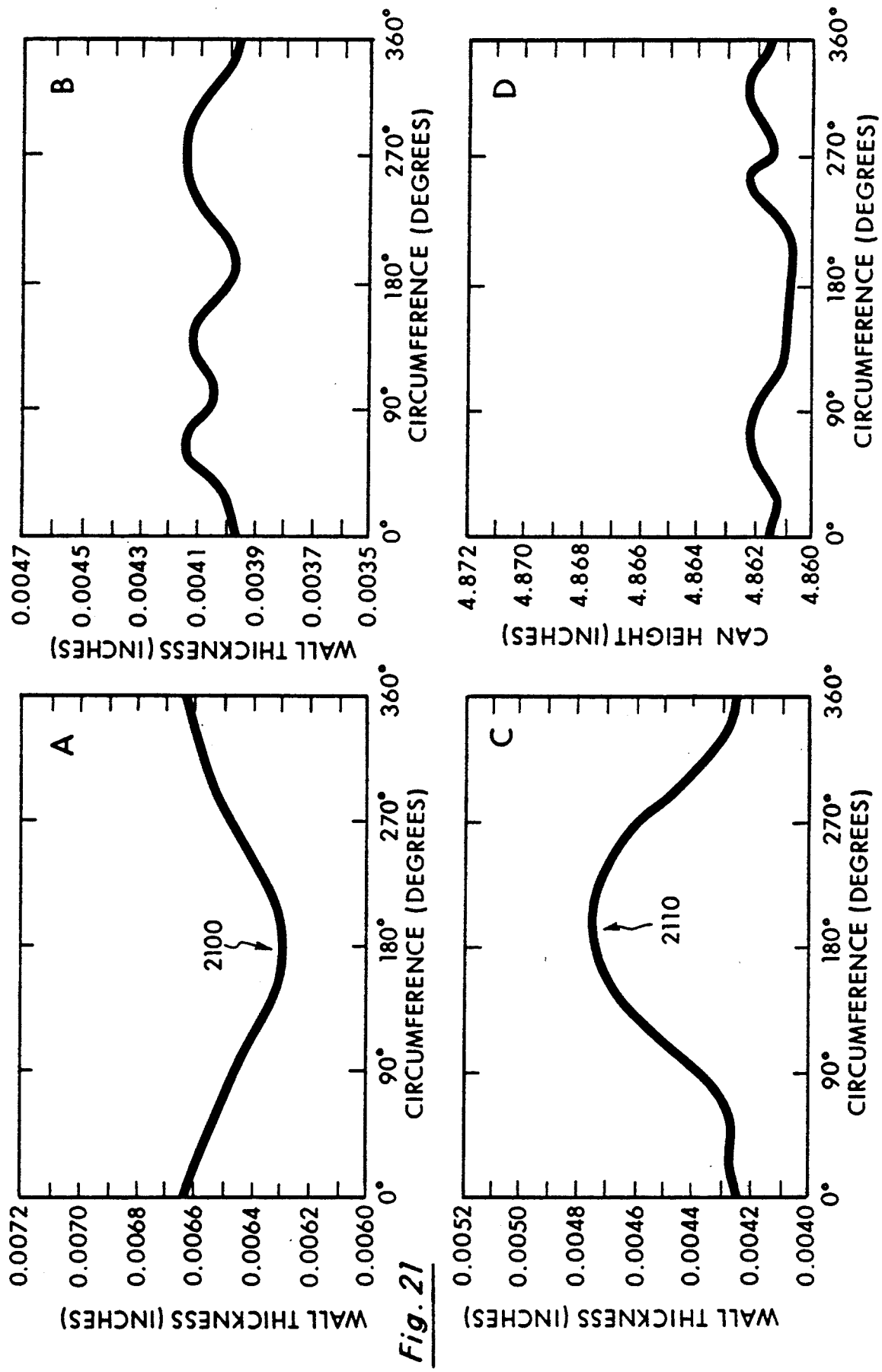
FIG. 21(A), 21(B), 21(C), and 21(D) sets forth experimental results of actual measurements made with the system of the present invention.

In FIG. 21, graphs A through D present actual experimental results which illustrate the teachings of the present invention. FIG. 21 is based on a single beverage can. Graph A is the sidewall measurements at position 42A of FIG. 3, Graph B is the sidewall measurements at position 42B, and Graph C is the sidewall measurements at position 42C. Graph D is the height measurements 1330 of FIG. 13.

In Graph A of FIG. 21, the measured beverage can exhibits a maximum sidewall thickness of about 0.00664 inch and a minimum sidewall thickness of 0.00630 inch. Graph A shows the measurements at 128 discrete points around the circumference at position 42A of FIG. 3. The range of deviation is 0.0003 inch and the mean thickness value is 0.0065 inch.

Graph B of FIG. 21 shows a maximum sidewall thickness of 0.00415 inch and a minimum sidewall thickness of 0.00397 inch. The range of deviation at location 42B is 0.0002 inch with a mean value of 0.00407 inch.

Graph C of FIG. 21 shows the measurements of sidewall thickness at elevation 42C. Here, the maximum wall thickness is 0.00475 inch with a minimum wall thickness of 0.00425 inch. The range of deviation is 0.0006 inch and the mean value is 0.0045 inch.

Finally, in Graph D of FIG. 21, the can height is measured under the teachings of the present invention. Here the can height has a maximum value of 4.8624 inches and a minimum value of 4.8608 inches. The range of deviation is 0.0016 inch with a mean value of 4.8616 inches.

It can be readily observed from the experimental results set forth in FIG. 21, that significant information concerning sidewall thickness and can height can be obtained under the teachings of the present invention. For example, the can measured in FIG. 21 shows interesting variations in sidewall thickness especially at the top (FIG. 21A) and bottom (FIG. 21C). At approximately 180°, the can near its top has a thin sidewall region 2100 whereas at the corresponding location at the bottom of the can, the bottom sidewall thickness is thick in region 2110.

The computer 50 can generate a sidewall thickness map based on the information shown in Graphs A, B, and C of FIG. 21.

Figure 22:
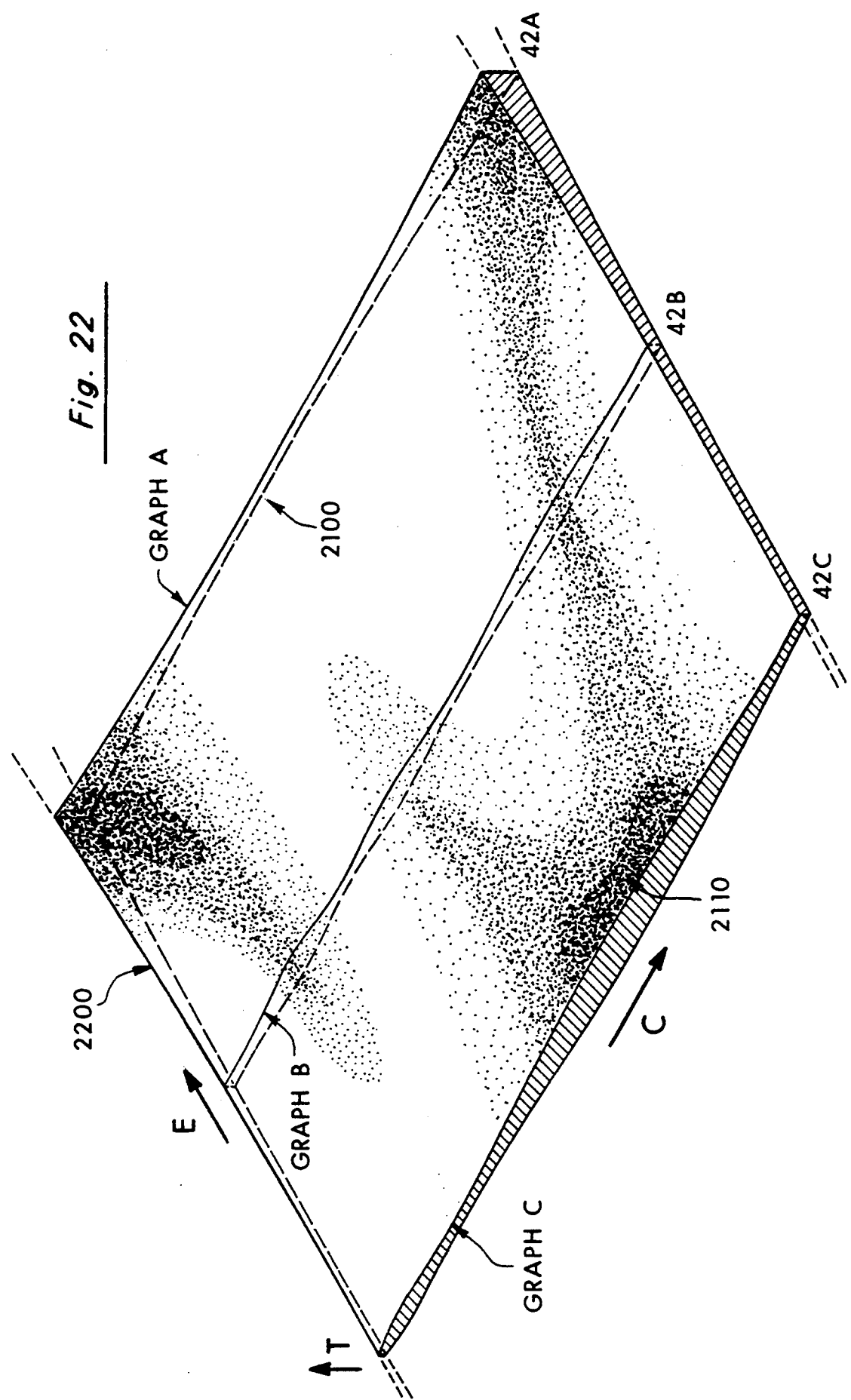
FIG. 22 sets forth the three dimensional sidewall thickness map generated by the computer 50 from information received from the contact measurement apparatus 20.

FIG. 22 represents the thickness map 2200 for can 40 having the thickness T, the elevation E, and the circumference C as coordinates.

This map 2200 is illustrated in FIG. 22. The regions 2100 and 2110 are identified. In FIG. 22, the sidewall thickness at each location 42A (Graph A), 42B (Graph B), and 42C (Graph C) are shown. The speckled areas indicate regions of thick sidewall thicknesses. The darker the speckling the greater the sidewall thickness. It is to be expressly understood that the map 2200 of FIG. 22 is based only upon the sidewall thickness data.

Figure 23:
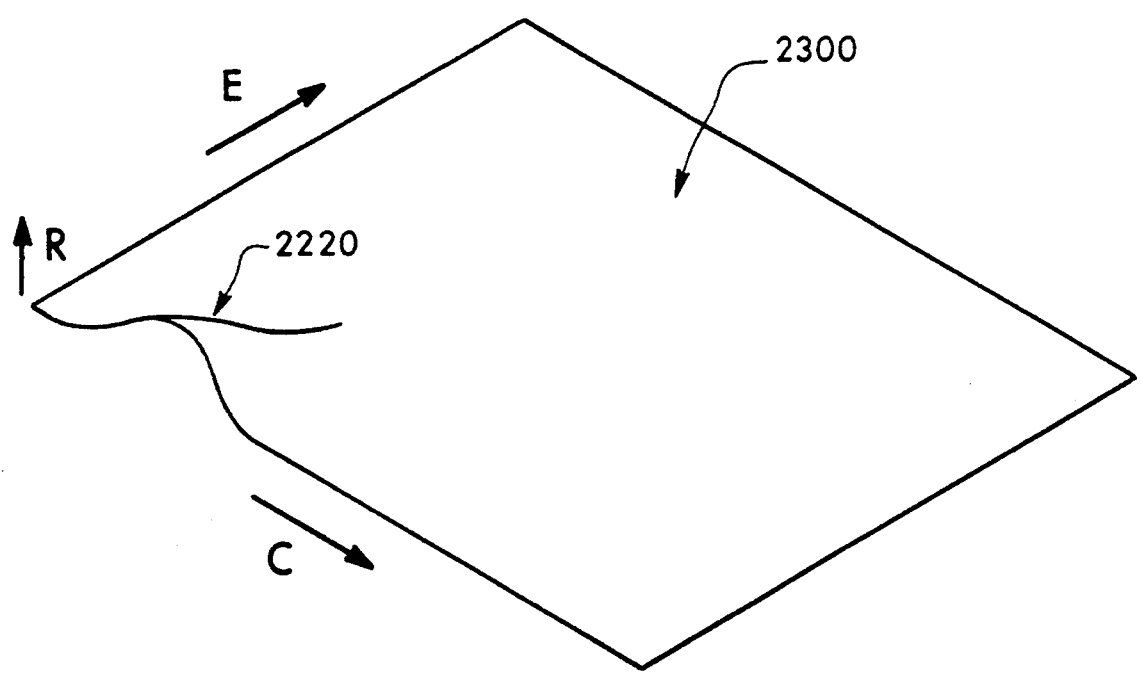
FIG. 23 illustrates the surface profile 14 obtained from the non-contact measurement apparatus 30 of the present invention.

Assume in FIG. 23 a dent 2200 exists in the sidewall 42 of a can 40. The dent 2220 is detected by the non-contact measurement apparatus 30 and as shown in FIG. 22 is outputted in a topological map 2300 having coordinates R (radial position), E (elevation), and C (circumference).

Figure 24:
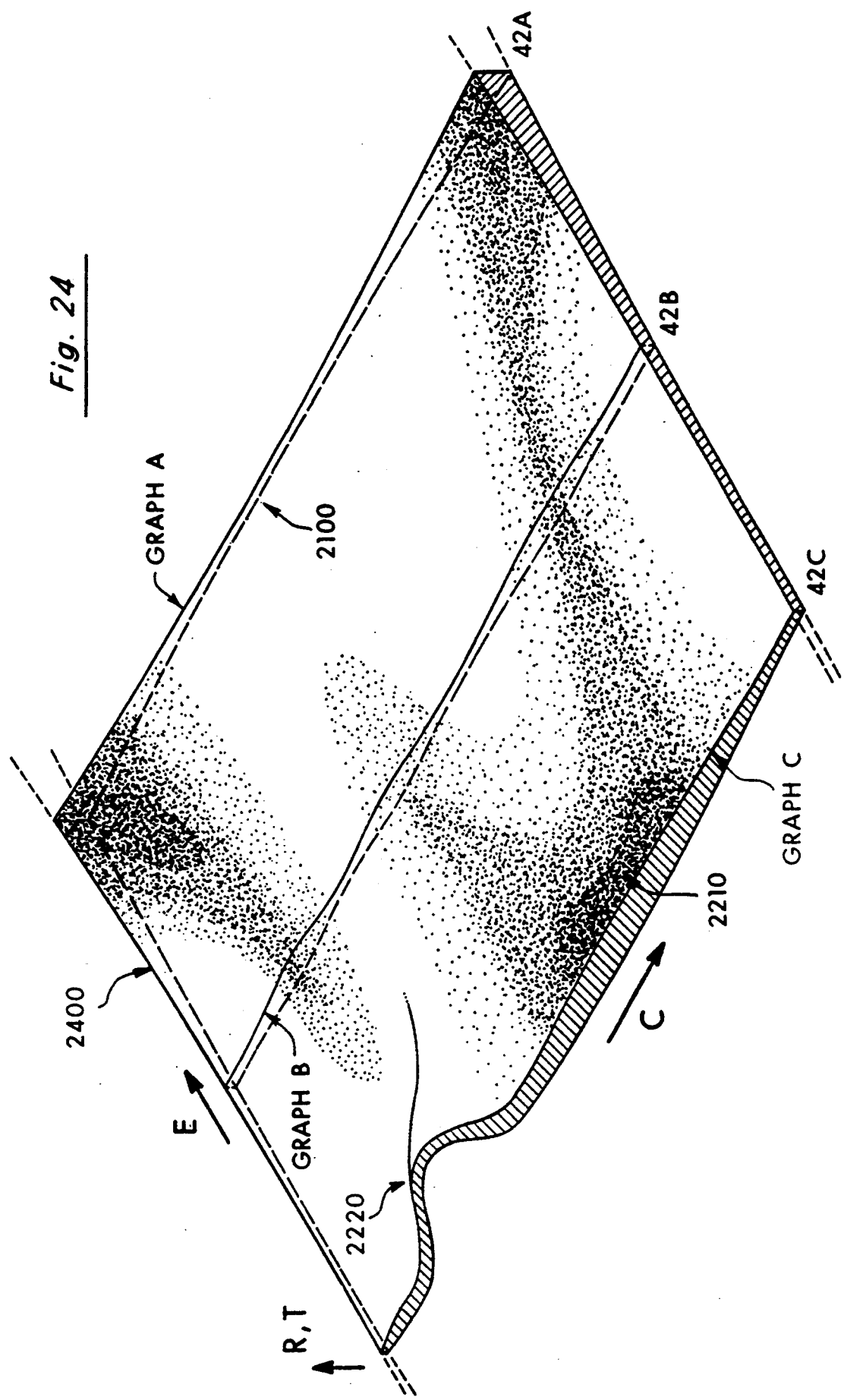
FIG. 24 sets forth an illustration of the solid model 16 produced by the information obtained from the contact measurement apparatus 20 and the non-contact apparatus 30.

Hence, the final solid model 2400 which correlates the outputs from the non-contact and contact measurement apparatuses 20 and 30 is shown in FIG. 24 as 2400. Here the sidewall thicknesses are combined with the surface profile information into an overall solid model 2400 having the elevation E and the circumference C but with the surface profile radius R and the corresponding T value to signify thickness. These data can be also displayed as an exaggerated can cylinder. The data set is in a format to permit direct inputting into a finite element stress program to model, for example, can column strength.

The present invention is fully capable of analyzing the entire sidewall of the can or simply a portion thereof.

13. Determination of Can Tilt

FIG. 25 is a graph of data generated by the present invention corresponding to the can of FIG. 21. The system of the present invention through data obtained from the surface profile generated by the non-contact measurement apparatus 30 provides information on can tilt. FIG. 25 sets forth two curves: tilt magnitude ($M_T$) curve 2500 and tilt angle ($A_T$) curve 2510. $M_t$ curve 2500 illustrates the magnitude of offset of the center line of the measured can with respect to the center of a reference circle. This is best shown in FIG. 26. In FIG. 26(a) the value of $M_T$ at elevation E1 (i.e., approximately 0.25 inch) on curve 2500 is zero. For E1, the center $R_C$ of a reference circle R overlays with the measured center $E1_C$ of the can at elevation E1. The reference circle for illustrative purposes is exaggerated in size. The system of the present invention uses elevation E1 since it corresponds to the external circumference of the can 40 where the dome is formed. It is presumed by the system of the present invention that $R_C$ equals $E1_C$ at this elevation.

Hence, in FIG. 25 as the elevation is increased to E2 (i.e., about 0.5 inches), curve 2500 shows a value of $M_T$ to be about 0.001 inch which is the offset from the true center of the reference circle. This is illustrated in FIG. 26(b) wherein the reference circle R is shown in dotted lines. The center $E2_C$ of the measured can at elevation E2 has moved by the offset $M_T = 0.001$ inch.

At this stage in the discussion, it is useful to discuss curve 2510. At elevation E1 on curve 2510, the angle of offset $A_T$ is zero degrees which corresponds to that shown in FIG. 26(a). However, at elevation E2, the angle of offset $A_T$ is +45 degrees. This is shown in FIG. 26(b).

At elevation E3 (i.e., about 3 inches), the measured can exhibits an offset $M_T$ value of about 0.0005 inch and an angular offset $A_T$ value of about zero degrees. This is illustrated in FIG. 26(c) wherein there is no angular difference between $R_C$ and $E3_C$ but the offset $M_T$ is indicated.

At elevation E4, the offset $M_T$ value is equal to about 0.0009 inch having an angle $A_T$ value of about 22 degrees. This is illustrated in FIG. 26(d).

It is to be understood that FIG. 26 illustrates (on an exaggerated basis) four discrete elevations from the two curves 2500 and 2510 of FIG. 25. It is to be expressly understood that the present invention obtains 440 discrete positions in the elevation direction and 128 discrete points in the angle direction. For the example of the can in FIG. 25, the present invention determines that the can undergoes a tilt first to the upper right, then down to the right and finally a twist to the upper right again. In FIG. 25, the two regions generally designated 2520 and 2530 of curve 2510 correspond to the region of a beverage can where the can is undergoing a transition from the dome bottom to the cylindrical sidewall. When the elevation is at 1.0 inch, the angle shown dotted at 2530 is not meaningful since the magnitude is zero. From about one inch to five inches in elevation, the two curves 2500 and 2510 represent the actual sidewall.

14. Determination of Ovality

Figure 27:
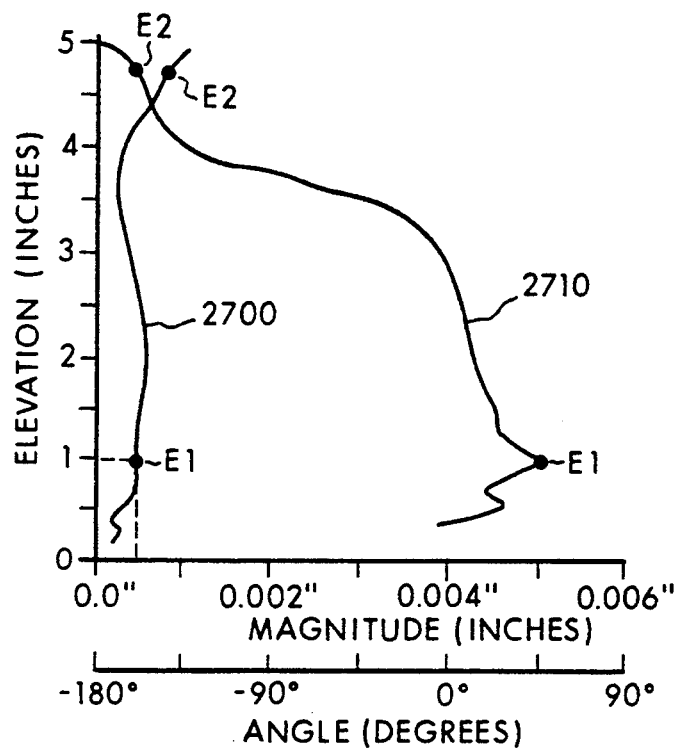
FIG. 27 sets forth data obtained from the non-contact measurement apparatus 30 for the ovality of a container.
Figure 28:
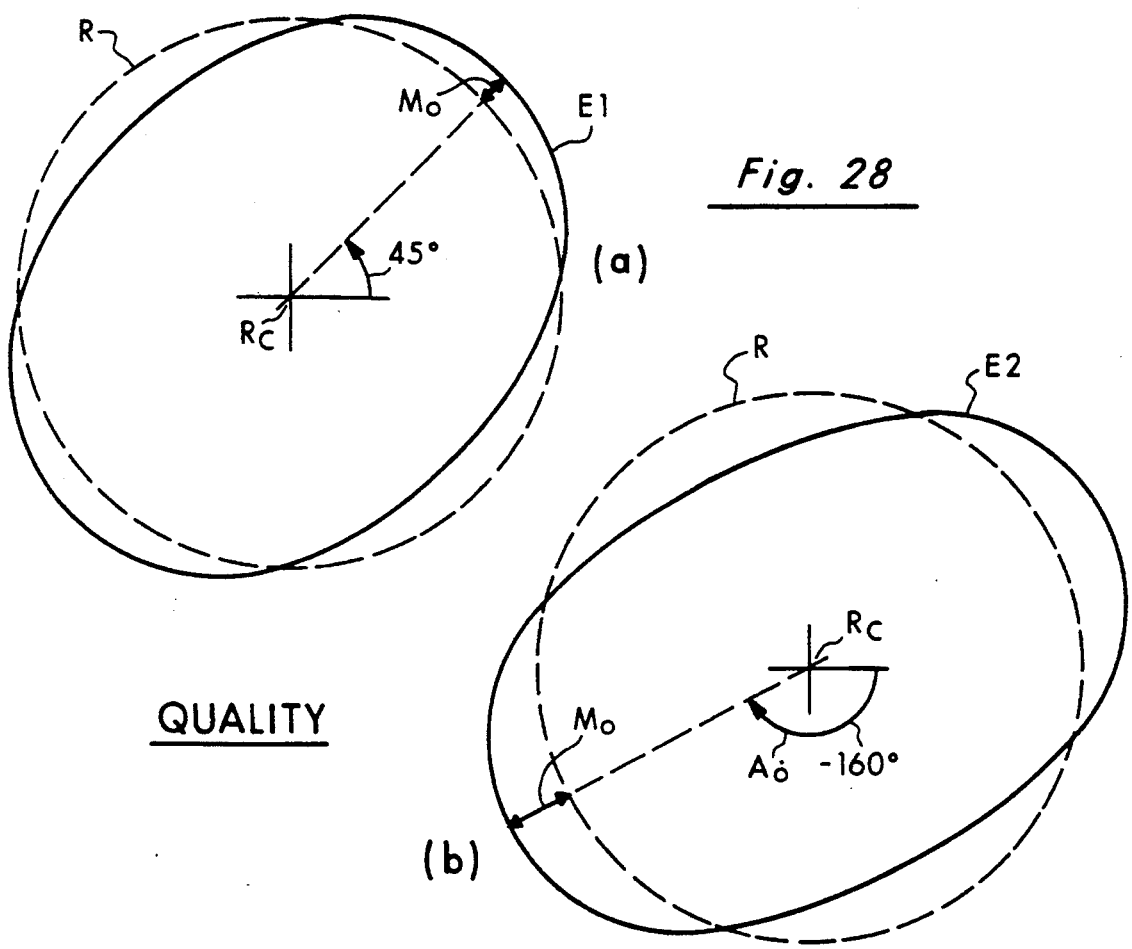
FIGS. 28(A) and 28(B) sets forth an illustration showing the ovality of the container.

In FIGS. 27 and 28 ovality of the can of FIG. 25 (and FIG. 21) is determined by the present invention. The ovality Fast Fourier Transform data (i.e., the "2" component) is shown in FIG. 27 and is obtained from the non-contact measurement apparatus 30 of the present invention. Curve 2700 illustrates the magnitude of ovality $M_O$ and curve 2710 sets forth the ovality angle $A_O$. Again, for purposes of illustration, FIG. 28 sets forth an illustration of the data at two elevations E1 and E2 of the can of FIG. 27.

FIG. 28 illustrates the ovality at two elevations, E1 and E2. Again, a reference circle R is shown in dotted lines having a reference center $R_C$. At location E1 the magnitude of the ovality from the reference circle R is shown as $M_0$. The angle of ovality $A_0$ is also shown.

In FIG. 28(a) the value of $M_0$ from FIG. 27 is about 0.0005 inch and the value of the ovality angle $A_0$ is about +45 degrees. In FIG. 28(b) the value of $M_0$ is about 0.0008 inch and the value of $A_0$ is about −160 degrees. From elevations E1 to E2, a significant angular change in ovality has occurred from (+45° to −160°).

15. Determination of Squarity

Figure 29:
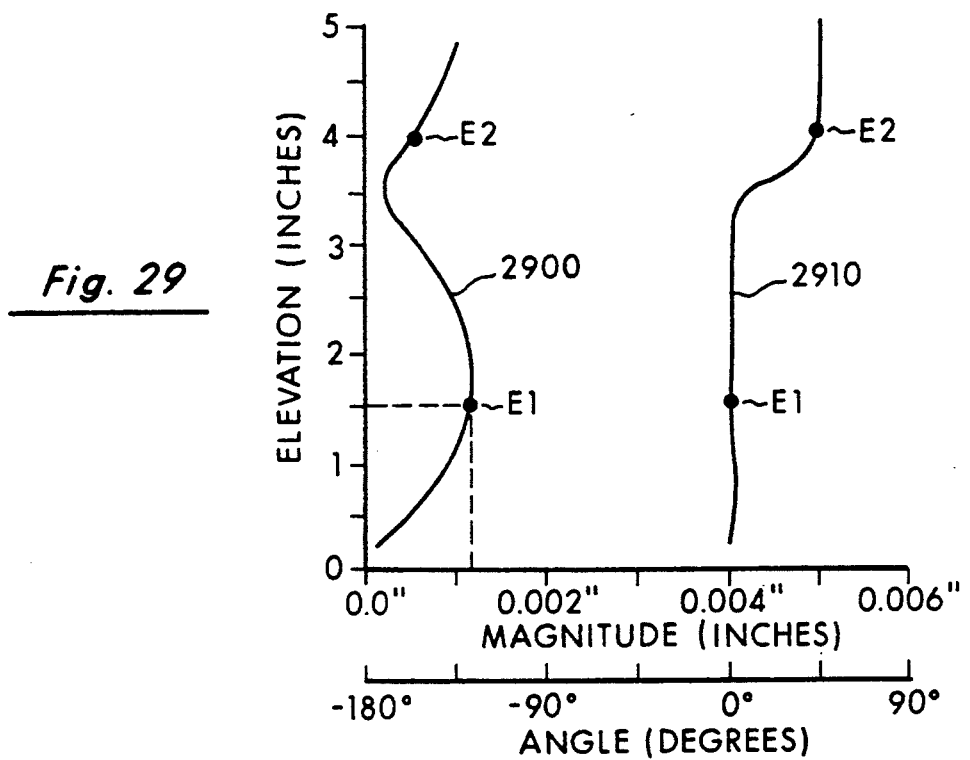
FIG. 29 sets forth digital information obtained from the non-contact measurement apparatus 30 pertaining to the squarity of a container.
Figure 30:
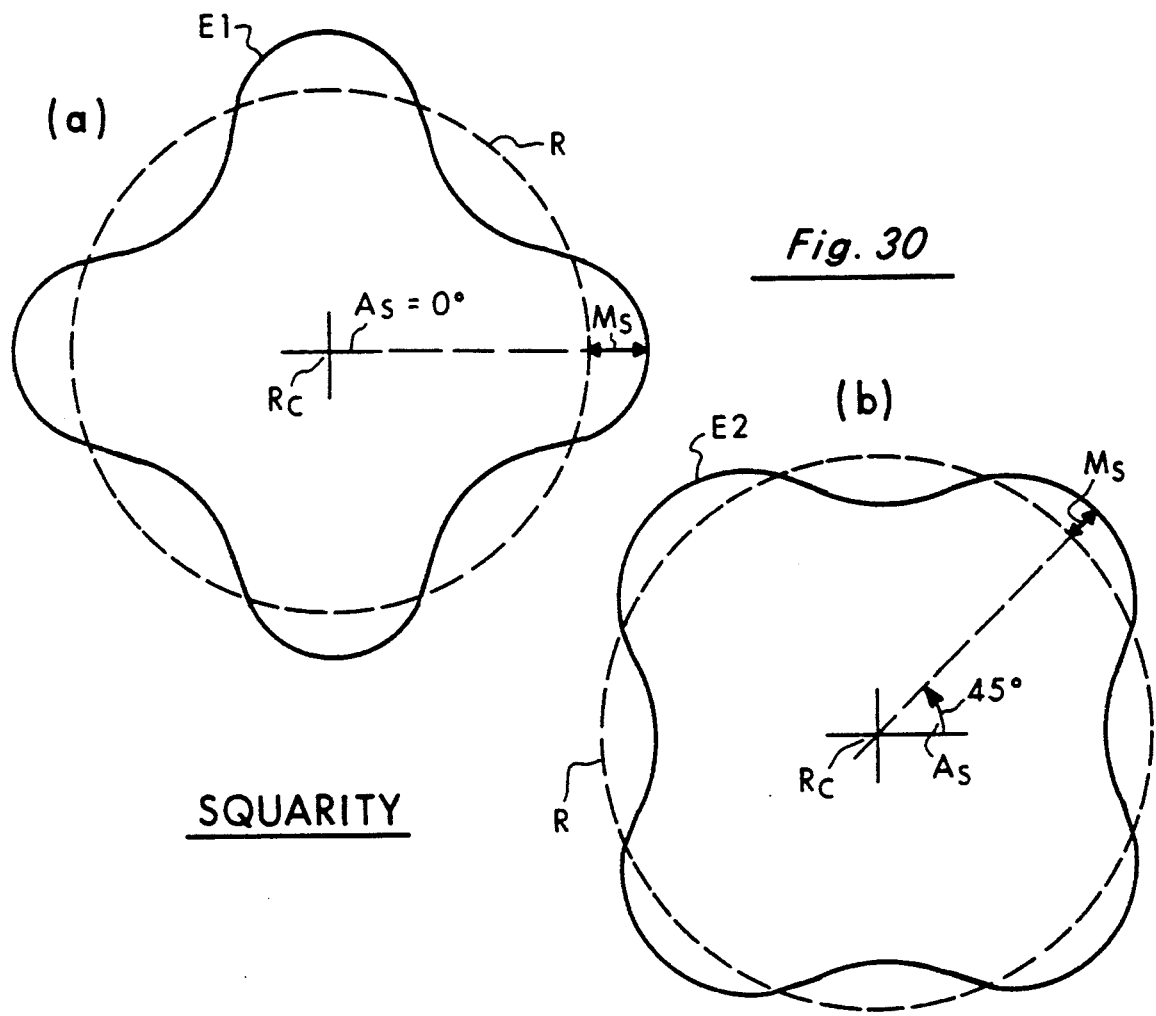
FIGS. 30(A) and 30(B) sets forth an illustration of the squarity of a container.

In FIGS. 29 and 30, the determination of squarity by computer 50 is illustrated. Squarity is the "4" component of the Fast Fourier Transform analysis performed by computer 50. Again, the reference circle R has a reference center $R_C$ and is shown in dotted lines in FIGS. 30(a) and 30(b). The measured can is shown as a solid line for the squarity component and, of course, in FIG. 30 is highly exaggerated to illustrate the teachings of the present invention.

In FIG. 29, curve 2900 represents the magnitude of squarity $M_S$ and curve 2910 represents the squarity angle $A_S$. In FIG. 29, two elevations E1 and E2 are used to illustrate the magnitude of squarity and angle of squarity. At elevation E1, the magnitude of squarity $M_S$ is about 0.001 inch and the angle of squarity is about zero degrees. This is illustrated in FIG. 30(a). At elevation E2 in FIG. 29 the magnitude of squarity $M_S$ equals about 0.0006 inch and the angle of squarity is about plus 45 degrees. This is illustrated in FIG. 30(b). From elevation E1 to E2 the angular change in squarity has been from 0° to +45°.

16. Determination of can Radius

Figure 31:
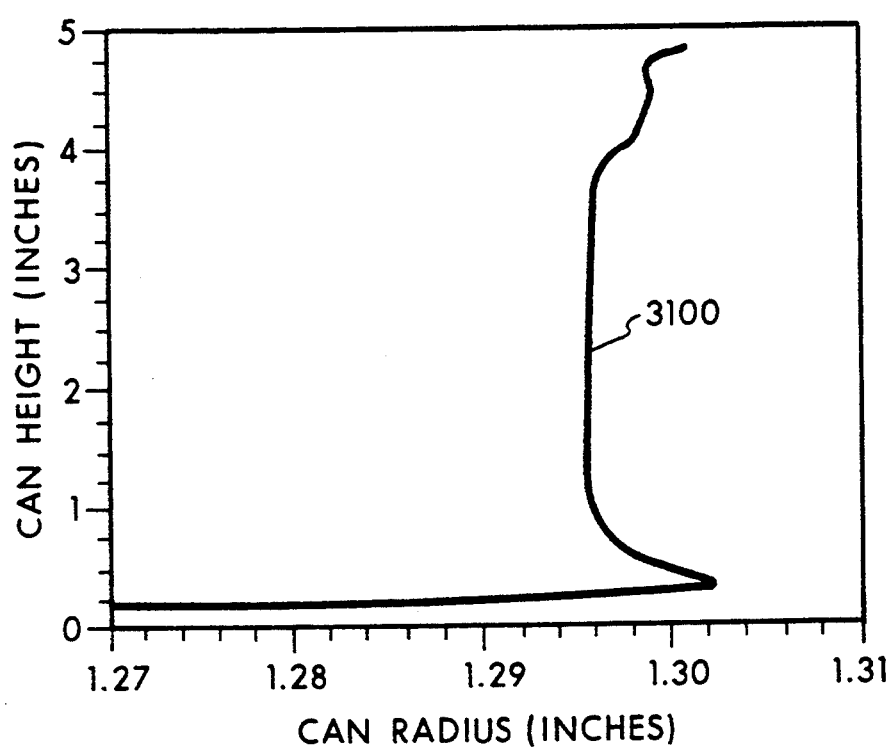
FIG. 31 sets forth the measured radius of a container at different elevations.

In FIG. 31, the can radius set forth in inches is plotted against can height also set forth in inches. This is represented by curve 3100.

It is to be expressly understood that the claimed invention is not to be limited to the description of the preferred embodiment but encompasses other modifications and alterations within the scope and spirit of the inventive concept.

We claim:

1. A system for generating a solid model of the sidewall of a container, said system comprising:

means for selectively holding said container, said holding means selectively placing said container in first and second locations, said holding means selectively rotating said container in said first and second positions, means operative when said container is rotated in said first position by said holding means for producing a three dimensional sidewall surface profile of said container, said producing means measuring the surface radius at a predetermined number of sample locations around the circumference of said container and at a predetermined number of locations along the elevation of said container without contacting said sidewall, means operative on said container when said container is rotated in said second position by said holding means for generating a three dimensional sidewall thickness map of said container, said generating means measuring sidewall thickness a predetermined number of times around the circumference of said container at a plurality of positions along said elevation of said container by contacting said sidewall, means connected to said holding means, said producing means and said generating means, for controlling the operation of said holding means, said producing means and said generating means, said controlling means including:

means connected to said producing means and said generating means for correlating said sidewall surface profile and said sidewall thickness map, said means for correlating outputting said solid model of said sidewall.

2. The system of claim 1 wherein said holding means comprises a mandrel, said mandrel being selectively raised and lowered between said first and second positions under control of said controlling means, said controlling means activating said mandrel to rotate when said mandrel is in said first and said second positions.

3. The system of claim 2 wherein said controlling means comprises a stepper motor connected to said mandrel for activating said mandrel to rotate.

4. The system of claim 1 wherein said producing means comprises:

means for illuminating said container to produce said plurality of shadow edges as said container is being rotated in said first position, means receptive of said plurality of shadow edges for outputting digital data corresponding to said plurality of shadow edges, said correlating means being receptive of said digital data from said means for outputting digital data.

5. The system of claim 1 wherein said generating means comprises:

a plurality of means for sensing the sidewall thickness of said container, each of said plurality of sensing means selectively engaging said sidewall of said container when said container is in said second position at one of said plurality of elevation locations, means connected to each of said plurality of sensing means and receptive of said sidewall thickness therefrom for converting said sidewall thickness into a corresponding digital electrical signal, said correlating means being receptive of said electrical digital signals from said converting means.

6. The system of claim 5 wherein each of said sensing means comprises:

a pair of scissors having an inner arm and an outer arm, means located at the bottom of each of said inner and outer arms and directed perpendicularly towards opposing sides of said sidewall of said container for contacting said opposing sides, means on the top end of each of said inner and outer arms for sensing the distance between said contacting means, said sensed distance being proportional to said thickness of said sidewall of said container, means connected to said inner and said outer arms at a location between said top and bottom ends for providing first and second pivoting about a central pivot, said first pivoting enabling said first and second arms to move on said central pivot so as to selectively open and close said contacting means on said sidewall of said container and said second pivoting enabling said first and second arms to move on said central pivot in order to track the position of said sidewall of said container as the radial diameter of said container varies during said rotation.

7. The system of claim 6 wherein said contacting means, said sensing means, and said central pivot are aligned along a vertical in when said contacting means contact each other so as to provide balance to said sensing means.

8. The system of claim 6 wherein said means for providing first and second pivoting is centrally located between said contacting means and said sensing means so as to minimize errors in said measured sidewall thickness due to thermal expansion.

9. The system of claim 6 wherein said contacting means comprises:

means for continuously engaging said sidewall of said container as said container rotates under action of said holding means.

10. The system of claim 9 wherein each of said contacting means comprises a spherical contact, said spherical contact being secured in said end of said arm, means for releasably holding said spherical contact towards said surface of said sidewall.

11. The system of claim 9 wherein each of said contacting means comprises a hemispherical contact, said hemispherical contact being secured in said end of said arm, a tip formed in the center of said hemispherical contact, means for holding said hemispherical contact towards said surface of said sidewall.

12. The system of claim 6 wherein each of said contacting means comprises:

means for selectively contacting said sidewall of said container as said container rotates under action of said holding means.

13. The system of claim 12 wherein each of said contacting means comprises a spherical contact, said spherical contact secured in said end of said arm, the diameter of said spherical contact being much less than the thickness of said end, said end being tapered towards said spherical contact.

14. The system of claim 12 wherein each of said contacting means comprises a spherical contact, said contact secured in said end of said arm, the diameter of said spherical contact being less than the thickness of said end.

15. The system of claim 1 further comprising means for selectively engaging the top of said container when said container is being rotated in said second position, said engaging means sensing the height of said container.

16. The system of claim 1 further comprising a means for selectively engaging the center dome of the bottom of said container for ascertaining the height of said dome when said container is in said second position.

17. The system of claim 1 further comprising means selectively engaging a reference plane on said holding means for ascertaining the elevation of said holding means as said holding means rotates said container.

18. An apparatus for measuring the sidewall thickness of the sidewall of a metal cylindrical container, said apparatus comprising:

means for selectively rotating said metal cylindrical container, means operative on said metal cylindrical container while said metal container is rotated by said selective rotating means for measuring said sidewall thickness a predetermined number of times around the circumference of said metal cylindrical container at a plurality of positions at predetermined elevations of said metal cylindrical container by contacting both the inside and outside surfaces of said sidewall, means connected to said rotating means and to said measuring means for controlling the operation of said selective rotating means and said measuring means wherein said measuring means comprises:

(a) a plurality of means for sensing said sidewall thickness of said metal cylindrical container, each of said plurality of sensing means selectively engaging said sidewall of said metal cylindrical container as said metal cylindrical container is being rotated at one of said plurality of elevation locations, each of said sensing means comprising:

(i) a pair of scissors having an inner arm and an outer arm, (ii) means located at the bottom end of each of said inner and outer arms and directed perpendicularly towards opposing sides of said sidewall of said metal cylindrical container for contacting said opposing sides, (iii) means on the top end of each of said inner and outer arms for sensing the distance between said contacting means, said sensed distance being proportional to said thickness of said sidewall of said metal cylindrical container.

(iv) means connected to said inner and said outer arms at a location between said top and bottom ends for providing first and second pivoting about a central pivot, said first pivoting enabling said first and second arms to move on said central pivot so as to selectively open and close said contacting means on said sidewall of said metal container and said second pivoting enabling said first and second arms to move on said central pivot in order to track the position of said sidewall of said metal cylindrical container as the radial diameter of said metal cylindrical container varies during said rotation, (b) means connected to each of said plurality of sensing means and receptive of said sidewall thickness therefrom for converting said sidewall thickness into a corresponding digital electrical signal, (c) said controlling means being receptive of said digital electrical signals from said converting means.

19. The system of claim 18 wherein said contacting means, said sensing means, and said central pivot are aligned along a vertical in when said contacting means contact each other so as to provide balance to said sensing means.

20. The system of claim 18 wherein said means for providing first and second pivoting is centrally located, between said contacting means and said sensing means so as to minimize errors in said measured sidewall thickness due to thermal expansion.

21. The system of claim 18 wherein said contacting means comprises:

means for continuously engaging said sidewall of said metal cylindrical container as said metal cylindrical container rotates under action of said holding means.

22. The system of claim 21 wherein each of said contacting means comprises a spherical contact, said spherical contact being secured in said end of said arm, means for releasably holding said spherical contact towards said surface of said sidewall.

23. The system of claim 21 wherein each of said contacting means comprises a hemispherical contact, said hemispherical contact being secured in said end of said arm, a tip formed in the center of said hemispherical contact, means for holding said hemispherical contact towards said surface of said sidewall.

24. The system of claim 18 wherein each of said contacting means comprises:

means for selectively contacting said sidewall of said metal cylindrical container as said metal cylindrical container rotates under action of said holding means.

25. The system of claim 24 wherein each of said contacting means comprises a spherical contact, said spherical contact secured in said end of said arm, the diameter of said spherical contact being much less than the thickness of said end, said end being tapered towards said spherical contact.

26. The system of claim 24 wherein each of said contacting means comprises a spherical contact, said contact secured in said end of said arm, the diameter of said spherical contact being less than the thickness of said end.

27. A system for generating sidewall information of a container, said system comprising:

means for selectively rotating said container, means operative when said container is rotated during a first time interval by said rotating means for producing a three dimensional sidewall surface profile of said container, said producing means measuring the surface radius at a predetermined number of sample locations around the circumference of said container and at a predetermined number of locations along the elevation of said container without contacting said sidewall, means operative on said container when said container is rotated during a second time interval by said rotating mean for generating a three dimensional sidewall thickness map of said container, said generating means measuring sidewall thickness a predetermined number of times around the circumference of said container at a plurality of positions along said elevation of said container by contacting said sidewall, means connected to said rotating means, said producing means and said generating means of controlling the operation of said rotating means, said producing means and said generating means, said controlling means including a means connected to said producing means and said generating means for correlating said sidewall surface profile from said producing means and said sidewall thickness map from said generating means to determining said sidewall information.

28. The system of claim 27 wherein said sidewall information comprises a solid model of said sidewall of said container.

29. The system of claim 27 wherein said sidewall information comprises the tilt of said container.

30. The system of claim 27 wherein said sidewall information comprises the ovality of said container.

31. The system of claim 27 wherein said sidewall information comprises the squarity of said container.

32. The system of claim 27 wherein said sidewall information comprises the radii of said container.

33. A method for generating sidewall information of a container, said method comprising the steps of:
  selectively rotating the container,
  producing three dimensional sidewall surface profile during a first time interval of said container rotation, the three dimensional sidewall surface profile constituting the surface radius at a predetermined number of sample locations around the circumference of the container and at a predetermined number of locations along the elevation of the container by detecting the shadow edge of the container when the container is rotated,
  generating a three dimensional sidewall thickness map of the container by probes contacting the sidewall of the container, the three dimensional sidewall thickness map of the container constituting sidewall thickness at a predetermined number of times around the circumference of the container at a plurality of positions along the elevation of the container,
  determining sidewall information of said container from the sidewall surface profile an the sidewall thickness map.

34. A balanced double-pivot scissors mechanism for measuring sidewall thickness of a container, said mechanism comprising:
  a pair of scissors having an inner arm and an outer arm,
  means located at the bottom end of each of said inner and outer arms and directed perpendicularly towards opposing sides of said sidewall of said container for contacting said opposing sides,
  means on the top end of each of said inner and outer arms for sensing the distance between said contacting means, said sensed distance being proportional to said thickness of said sidewall of said container,
  means connected to said inner and said outer arms at a location between said top and bottom ends for providing first and second pivoting about a central pivot, said first pivoting enabling said first and second arms to move on said central pivot so as to selectively open and close said contacting means on said sidewall of said container and said second pivoting enabling said first and second arms to move on said central pivot in order to track the position of said sidewall of said container as the radial diameter of said container varies.

35. The mechanism of claim 34 wherein said contacting means, said sensing means, and said central pivot of said providing means are aligned along a vertical in when said contacting means contact each other so as to provide balance to said sensing means.

36. The system of claim 34 wherein said means for providing first and second pivoting is centrally located, between said contacting means and said sensing means so as to minimize efforts in said measured sidewall thickness due to thermal expansion.

37. The mechanism of claim 34 wherein said contacting means comprises:
  means for continuously engaging said sidewall of said container when said container rotates.

38. The mechanism of claim 37 wherein each of said contacting means comprises a spherical contact, said spherical contact being secured in said end of said arm,
  means for releasably holding said spherical contact towards said surface of said sidewall.

39. The mechanism of claim 37 wherein each of said contacting means comprises a hemispherical contact, said hemispherical contact being secured in said end of said arm,
  a tip formed in the center of said hemispherical contact,
  means for holding said hemispherical contact towards said surface of said sidewall.

40. The mechanism of claim 37 wherein each of said contacting means comprises:
  means for selectively contacting said sidewall of said container when said container rotates.

41. The mechanism of claim 40 wherein each of said contacting means comprises a spherical contact, said spherical contact secured in said end of said arm, the diameter of said spherical contact being much less than the thickness of said end,
  said end being tapered towards said spherical contact.

42. The mechanism of claim 40 wherein each of said contacting means comprises a spherical contact, said contact secured in said end of said arm, the diameter of said spherical contact being less than the thickness of said end.

43. A balanced double-pivot scissors mechanism for measuring sidewall thickness of a cylinder, said mechanism comprising:
  a pair of scissors having an inner arm and an outer arm,
  means located near the bottom end of each of said inner and outer arms and directed perpendicularly towards opposing sides of said sidewall of said cylinder for contacting said opposing sides,
  means near the top end of each of said inner and outer arms for sensing the distance between said contacting means, said sensed distance being proportional to said thickness of said sidewall of said cylinder,
  means connected to said inner and said outer arms at a location between said top and bottom ends for providing first and second pivoting about a central pivot, said first pivoting enabling said first and second arms to move on said central pivot so as to selectively open and close said contacting means on said sidewall of said object and said second pivoting enabling said first and second arms to move on said central pivot in order to track the position of said sidewall of said cylinder, said means for providing first and second pivoting being centrally located, between said contacting means and said sensing means so as to minimize errors in said measured sidewall thickness due to thermal expansion, wherein said contacting means, said sensing means, and said central pivot are aligned along a vertical line when said contacting means contact each other so as to provide balance to said mechanism.

* * * * *